US010368372B2

(12) United States Patent
Chendamarai Kannan et al.

(10) Patent No.: US 10,368,372 B2
(45) Date of Patent: Jul. 30, 2019

(54) LISTEN-BEFORE-TALK TECHNIQUES FOR UPLINK TRANSMISSIONS

(71) Applicant: QUALCOMM Incorporated, San Diego, CA (US)

(72) Inventors: Arumugam Chendamarai Kannan, San Diego, CA (US); Tao Luo, San Diego, CA (US); Chirag Patel, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 15/404,171

(22) Filed: Jan. 11, 2017

(65) Prior Publication Data
US 2017/0202022 A1 Jul. 13, 2017

Related U.S. Application Data

(60) Provisional application No. 62/277,860, filed on Jan. 12, 2016, provisional application No. 62/318,727, (Continued)

(51) Int. Cl.
*H04L 1/18* (2006.01)
*H04W 74/08* (2009.01)
(Continued)

(52) U.S. Cl.
CPC ... *H04W 74/0816* (2013.01); *H04W 72/0446* (2013.01); *H04W 72/14* (2013.01); *H04W 74/006* (2013.01); *H04W 74/0808* (2013.01)

(58) Field of Classification Search
None
See application file for complete search history.

(56) References Cited

U.S. PATENT DOCUMENTS

2014/0362780 A1* 12/2014 Malladi ............... H04W 16/14
370/329
2016/0278049 A1* 9/2016 Nory ..................... H04L 1/1896
(Continued)

OTHER PUBLICATIONS

Huawei et al., "UL LBT for LAA", 3GPP TSG RAN WG1 Meeting #82bis, R1-155099, Malmo, Sweden, Oct. 5-9, 2015, 4 pgs., XP051002087, 3rd Generation Partnership Project.
(Continued)

*Primary Examiner* — Sithu Ko
(74) *Attorney, Agent, or Firm* — Holland & Hart LLP

(57) ABSTRACT

Techniques for performing listen before talk (LBT) channel contention procedures in a shared radio frequency spectrum band are provided. The LBT techniques may include a shortened LBT procedure that may be selected if a base station has reserved a shared channel for a duration of expected user equipment (UE) uplink transmissions, and a full LBT procedure that may be selected if the base station has not reserved the channel for the duration of expected UE uplink transmissions. The shortened LBT procedure may include detecting energy levels of the channel for a relatively short time period relative to the full LBT procedure. The shortened LBT procedure may be selected if a time period between a UE receiving a grant of uplink resources and the beginning of the uplink resources is less than a threshold time value.

26 Claims, 23 Drawing Sheets

Related U.S. Application Data filed on Apr. 5, 2016, provisional application No. 62/323,777, filed on Apr. 17, 2016.

(51) Int. Cl.
*H04W 72/04* (2009.01)
*H04W 72/14* (2009.01)
*H04W 74/00* (2009.01)

(56) References Cited

U.S. PATENT DOCUMENTS

2017/0111217 A1* 4/2017 Kim .................. H04L 5/001
2017/0339717 A1* 11/2017 Futaki ................ H04W 16/14

OTHER PUBLICATIONS

Intel Corporation, "Uplink Transmission for LAA," 3GPP TSG-RAN WG2 Meeting #90, R2-152214, Fukuoka, Japan, May 25-29, 2015, 5 pgs., XP050973839, 3rd Generation Partnership Project.

ISA/EP, International Search Report and Written Opinion of the International Searching Authority, Int'l Application No. PCT/US2017/013204, dated Apr. 19, 2017, European Patent Office, Rijswijk, NL, 16 pgs.

LG Electronics, "Candidate Solutions for LAA Operation," 3GPP TSG RAN WG1 Meeting #78bis, R1-144042, Ljubljana, Slovenia, Oct. 6-10, 2014, 6 pgs., XP050869704, 3rd Generation Partnership Project.

ZTE, "UL Framework for LAA," 3GPP TSG RAN WG1 Meeting #82bis, R1-155245, Malmo, Sweden, Oct. 5-9, 2015, 6 pgs., XP051002210, 3rd Generation Partnership Project.

* cited by examiner

LISTEN-BEFORE-TALK TECHNIQUES FOR UPLINK TRANSMISSIONS

CROSS REFERENCES

The present Application for Patent claims priority to U.S. Provisional Patent Application No. 62/277,860 by Chendamarai Kannan, et al., entitled "Listen-Before-Talk Techniques For Uplink Transmissions," filed Jan. 12, 2016, and to U.S. Provisional Patent Application No. 62/318,727 by Chendamarai Kannan, et al, entitled "Listen-Before-Talk Techniques For Uplink Transmissions," filed Apr. 5, 2016, and to U.S. Provisional Patent Application No. 62/323,777 by Chendamarai Kannan, et al., entitled "Listen-Before-Talk Techniques For Uplink Transmissions," filed Apr. 17, 2016, each assigned to the assignee hereof, and each of which is hereby expressly incorporated by reference herein in its entirety.

BACKGROUND

The following relates generally to wireless communication, and more specifically to listen-before-talk (LBT) techniques for uplink transmissions from a user equipment (UE) to a base station.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Some modes of communication may enable communication between a base station and a UE in a shared radio frequency spectrum band, or in different radio frequency spectrum bands (e.g., in a licensed radio frequency spectrum band and a shared radio frequency spectrum band) of a cellular network. However, in contrast to a carrier in a licensed radio frequency spectrum band, which may be allocated for use by the devices of one public land mobile network (PLMN) and be available to a base station or a UE of the PLMN at predetermined (or all) times, a carrier in a shared radio frequency spectrum band may be available for use by the devices of the PLMN intermittently. This intermittent availability may be a result of contention for access to the carrier of the shared radio frequency spectrum band, between devices of the PLMN, devices of one or more other PLMNs, and/or other devices (e.g., Wi-Fi devices). For some radio frames, a device of a PLMN may win contention for access to a carrier in the shared radio frequency spectrum band, while for other radio frames, the device may not win contention for access to the carrier in the shared radio frequency spectrum band.

Because of the intermittent availability of carriers in a shared radio frequency spectrum band, base stations and UEs may use techniques that provide fairness in coexistence with other users of the shared radio frequency spectrum band, and that still provide reliable communications. For example, such techniques may include establishing radio frame intervals in which a base station may win contention for the shared radio frequency spectrum band and reserve the shared radio frequency spectrum band for some or all of an expected uplink transmission from a UE. Such techniques may increase the likelihood that the UE will win contention for uplink transmissions associated with a radio frame, and it may be desirable in some systems to periodically adjust some parameters associated with reservation of the medium or scheduling of UE uplink transmissions, in order to enhance system efficiency. Efficient techniques for uplink scheduling and channel contention in a shared radio frequency spectrum band may enhance the operation of such networks.

SUMMARY

The present disclosure, for example, relates to wireless communication systems, and more particularly to techniques for performing listen before talk (LBT) channel contention procedures in a shared radio frequency spectrum band. As previously indicated, in some cases it may be desirable to adjust one or more parameters associated with reservation of the medium or scheduling of user equipment (UE) uplink transmissions. Various aspects of the present disclosure provide different LBT techniques for uplink transmissions that may be selected based on scheduling and channel reservation parameters. In some examples, a base station may reserve a channel in the shared radio frequency spectrum band through a LBT procedure performed by the base station for a duration of time associated with a transmission opportunity (TxOP). The TxOP may, for example, correspond to a duration of a radio frame, in which the radio frame may include both downlink transmissions from the base station to a UE as well as uplink transmissions from the UE to the base station. Prior to transmitting uplink transmissions, the UE may perform a LBT procedure to confirm that other users of the shared radio frequency spectrum band are not attempting to transmit.

The techniques described in the present disclosure provide a shortened LBT procedure that may be selected if the base station has reserved the channel for the duration of expected UE uplink transmissions, and provide for a full LBT procedure that may be selected if the base station has not reserved the channel for the duration of expected UE uplink transmissions. In some examples, the shortened LBT procedure may include detecting energy levels of the channel for a relatively short time period, or detecting a commonly agreed preamble signal, by the UE prior to transmitting uplink transmissions, and the full LBT procedure may include detecting energy levels (or detecting a commonly agreed preamble signal) of the channel for a contention window that is longer than the shortened LBT monitoring period and that is determined according to established contention window and backoff determinations. In some examples, if a time period between a UE receiving a grant of uplink resources and the beginning of the uplink resources is less than a threshold time value, the UE may use the shortened LBT procedure, and otherwise the UE may use the full LBT procedure. In some examples, the base station may explicitly indicate in the uplink grant which LBT scheme a UE is to perform. In such examples, the UE may perform a shortened LBT procedure or a full LBT procedure or skip LBT altogether, based at least in part on the indication included in the uplink grant. In some examples, the uplink grant for the UE may be for uplink resources that are in a different transmission opportunity (TxOP) than the TxOP in which the uplink grant is provided. In some such cases, the UE may monitor the channel to determine if the base station has won channel contention for the different TxOP and perform the shortened LBT procedure if the base station has won channel contention.

In some examples, one of the parameters for LBT may be a size of the contention window, which may be adapted based on an acknowledgment/negative-acknowledgment (ACK/NACK) of a prior transmission received from the UE. In some examples, contention window adaptation may be done differently based on the mechanism by which the ACK/NACK received. For example, if the uplink acknowledgement channel is contention exempt (e.g., transmitted without a prior LBT process), then the LBT parameters may be adjusted based on the reception of NACK or absence of the uplink acknowledge channel itself (DTX). However, if the uplink acknowledgement channel is subject to contention, then the downlink LBT parameters may be adjusted based on a NACK only, without consideration of missed acknowledgements (DTX) for the purposes of contention window adjustment.

In some examples, an uplink grant may be transmitted from a base station to a UE. The uplink grant may be transmitted in a first subframe and contain an indication of uplink resources for an uplink transmission from the UE in a second subframe that is subsequent to the first subframe. In some examples, one or more parameters for the uplink transmission may be provided either with the uplink grant or separately from the uplink grant. Such parameters may include, for example, a starting time for the uplink transmission, a duration of the uplink grant (e.g., a number of uplink subframes that the grant covers), a time at which the uplink grant expires, or any combination thereof. In some examples, a base station, after transmitting the uplink grant, may transmit a trigger to initiate the uplink transmission at the UE. The trigger may be transmitted, for example, in a common control channel transmission that is broadcast to multiple UEs, in a unicast control channel transmission to a particular UE, or in layer-1 signaling. In some examples, the uplink resources may be modified based on certain conditions, such as if the trigger is missed and transmitted in a subsequent subframe or if an LBT procedure fails for a TxOP. In some cases, the uplink resources may be modified to truncate the uplink resources to remove resources associated with a time period associated with the missed trigger of LBT failure, or the uplink resources may be modified to shift the resources to subsequent subframes.

A method of wireless communication is described. The method may include receiving an UL grant identifying UL resources for an UL transmission and identifying a LBT scheme for initiating the UL transmission based at least in part on information received in the UL grant.

An apparatus for wireless communication is described. The apparatus may include means for receiving an UL grant identifying UL resources for an UL transmission and means for identifying a LBT scheme for initiating the UL transmission based at least in part on information received in the UL grant.

A further apparatus is described. The apparatus may include a processor, memory in electronic communication with the processor, and instructions stored in the memory. The instructions may be operable to cause the processor to receive an UL grant identifying UL resources for an UL transmission and identify a LBT scheme for initiating the UL transmission based at least in part on information received in the UL grant.

A non-transitory computer readable medium for wireless communication is described. The non-transitory computer-readable medium may include instructions to cause a processor to receive an UL grant identifying UL resources for an UL transmission and identify a LBT scheme for initiating the UL transmission based on information received in the UL grant.

Some examples of the method, apparatus, or non-transitory computer-readable medium described above may further include processes, features, means, or instructions for determining, after receiving the UL grant, the time difference between receiving the UL grant and the UL resources for the UL transmission. Some examples of the method, apparatus, or non-transitory computer-readable medium described above may further include processes, features, means, or instructions for performing the selected LBT scheme to initiate the UL transmission.

In some examples of the method, apparatus, or non-transitory computer-readable medium described above, the selecting the LBT scheme further comprises: selecting a first LBT scheme when the time difference is at or below a threshold time value. Some examples of the method, apparatus, or non-transitory computer-readable medium described above may further include processes, features, means, or instructions for selecting a second LBT scheme when the time difference exceeds the threshold time value.

In some examples of the method, apparatus, or non-transitory computer-readable medium described above, the first LBT scheme comprises an abbreviated LBT scheme relative to the second LBT scheme. In some examples of the method, apparatus, or non-transitory computer-readable medium described above, the threshold time value corresponds to a remaining time within a current transmission opportunity (TxOP).

In some examples of the method, apparatus, or non-transitory computer-readable medium described above, the threshold time value corresponds to a remaining time within a current LBT frame. Some examples of the method, apparatus, or non-transitory computer-readable medium described above may further include processes, features, means, or instructions for receiving one or more parameters for selecting the LBT scheme for initiating the UL transmission, wherein the selecting the LBT scheme is further based on the one or more parameters.

In some examples of the method, apparatus, or non-transitory computer-readable medium described above, the one or more parameters comprise one or more of a threshold time value, a channel reservation duration value, or a LBT frame duration value. In some examples of the method, apparatus, or non-transitory computer-readable medium described above, the receiving one or more parameters comprises: receiving one or more of a common downlink (DL) control channel transmission, the UL grant, or radio resource control (RRC) signaling including the one or more parameters.

Some examples of the method, apparatus, or non-transitory computer-readable medium described above may further include processes, features, means, or instructions for determining that the UL resources for the UL transmission are in a subsequent transmission opportunity (TxOP) outside of a current TxOP. Some examples of the method, apparatus, or non-transitory computer-readable medium described above may further include processes, features, means, or instructions for determining whether a base station transmitting the UL grant has successfully performed a LBT for the subsequent TxOP, wherein the selecting the LBT scheme is further based at least in part on whether the base station has successfully performed a LBT for the subsequent TxOP.

In some examples of the method, apparatus, or non-transitory computer-readable medium described above, the selecting the LBT scheme further comprises: selecting a first LBT scheme when it is determined that the base station has successfully performed a LBT for the subsequent TxOP. Some examples of the method, apparatus, or non-transitory computer-readable medium described above may further include processes, features, means, or instructions for selecting a second LBT scheme when it is determined that the base station has not successfully performed a LBT for the subsequent TxOP, and wherein the first LBT scheme comprises an abbreviated LBT scheme relative to the second LBT scheme.

Some examples of the method, apparatus, or non-transitory computer-readable medium described above may further include processes, features, means, or instructions for initiating a timer after receiving the UL grant, wherein the selecting the LBT scheme is further based at least in part on the timer.

In some examples of the method, apparatus, or non-transitory computer-readable medium described above, an energy detection threshold or a contention window (CW) size is determined based on the timer. In some examples of the method, apparatus, or non-transitory computer-readable medium described above, the energy detection threshold, or CW size are selected as a function of a value of the timer when initiating the LBT scheme.

In some examples of the method, apparatus, or non-transitory computer-readable medium described above, the receiving the UL grant comprises: receiving UL resources for UL transmissions in two or more UL subframes, and wherein the selecting the LBT scheme for initiating each UL transmission for each of the two or more UL subframes is based on associated time differences between receiving the UL grant and the UL resources associated with each UL subframe. In some examples of the method, apparatus, or non-transitory computer-readable medium described above, the UL resources for the two or more UL subframes are indicated in the UL grant or linked to a previous grant of UL resources.

In some examples of the method, apparatus, or non-transitory computer-readable medium described above, the receiving the uplink grant may include receiving, in a first subframe, uplink resources for an uplink transmission in a second subframe that is subsequent to the first subframe. In some examples, the uplink grant may indicate a starting time for the uplink transmission, which may be determined based at least in part on a first time between the uplink grant and the beginning of the uplink resources or a second time between the beginning of the second subframe and the beginning of the uplink resources.

In some examples of the method, apparatus, or non-transitory computer-readable medium described above, the uplink grant may indicate duration of the uplink grant. In some examples, the duration of the uplink grant may be determined based at least in part on an indicated duration of the uplink transmission contained in the uplink grant, a first time between the uplink grant and the end of the uplink resources or a second time between the beginning of the second subframe and the end of the uplink resources.

In some examples of the method, apparatus, or non-transitory computer-readable medium described above, the uplink grant may indicate duration of a TxOP that includes one or more of the first subframe or second subframe. The duration of the TxOP may be determined, in some examples, based at least in part on one or more of an indication of the TxOP duration, a length of one or more downlink bursts within the TxOP, a length of one or more uplink bursts within the TxOP, or a frame structure for the first subframe and second subframe.

In some examples of the method, apparatus, or non-transitory computer-readable medium described above, a trigger may be received to initiate the uplink transmission. The trigger may include, for example, an indication received in a broadcast control channel transmission, an indication in a unicast control channel transmission, or an indication in layer-1 signaling. In some examples, the trigger may include an indication that the uplink transmission is to be started or an indication of an uplink subframe location within a transmission opportunity. The trigger may be transmitted on multiple downlink subframes. In some cases, it may be determined that the trigger to start the uplink transmission is not received within a first time period, and the uplink resources may be modified based at least in part on the determination. In some examples, the uplink resources may be modified to shift the uplink resources to a subsequent subframe, or disregard uplink resources within the first time period.

In some examples of the method, apparatus, or non-transitory computer-readable medium described above, the selected LBT scheme may be performed following the trigger, and it may be determined that a wireless medium is not available for uplink transmissions. In some cases, the uplink resources may be modified based at least in part on determining that the LBT failed. The uplink resources may be modified, for example, by shifting the uplink resources to a subsequent subframe, or disregarding uplink resources within a time period associated with the selected LBT scheme. In some examples, an indication of an expiration of the uplink grant may be received in the uplink grant, in semi-static signaling, or may be statically configured. The expiration of the uplink grant may corresponds to a total transmission length associated with a transmission opportunity for the uplink transmission or an uplink burst length of the uplink resources within the transmission opportunity, for example.

A method of wireless communication is described. The method may include identifying one or more timing parameters for use by a UE to select a LBT scheme for initiating an UL transmission and transmitting, to the UE, an UL grant identifying UL resources for the UL transmission.

An apparatus for wireless communication is described. The apparatus may include means for identifying one or more timing parameters for use by a UE to select a LBT scheme for initiating an UL transmission and means for transmitting, to the UE, an UL grant identifying UL resources for the UL transmission.

A further apparatus is described. The apparatus may include a processor, memory in electronic communication with the processor, and instructions stored in the memory. The instructions may be operable to cause the processor to identify one or more timing parameters for use by a UE to select a LBT scheme for initiating an UL transmission and transmit, to the UE, an UL grant identifying UL resources for the UL transmission.

A non-transitory computer readable medium for wireless communication is described. The non-transitory computer-readable medium may include instructions to cause a processor to identify one or more timing parameters for use by a UE to select a LBT scheme for initiating an UL transmission and transmit, to the UE, an UL grant identifying UL resources for the UL transmission.

Some examples of the method, apparatus, or non-transitory computer-readable medium described above may further include processes, features, means, or instructions for performing a LBT procedure to reserve a wireless communications channel for both a DL transmission to the UE and the UL transmission.

In some examples of the method, apparatus, or non-transitory computer-readable medium described above, the one or more timing parameters comprise one or more of a threshold time value between receipt of the UL grant and the UL resources and an indication of the LBT scheme to be selected based on the threshold time value. In some examples of the method, apparatus, or non-transitory computer-readable medium described above, the indication of the LBT scheme comprises: a first indication that a first LBT scheme is to be used when a time difference between receipt of the UL grant and the UL resources is at or below the threshold time value and a second indication that a second LBT scheme is to be used when the time difference between receipt of the UL grant and the UL resources exceeds the threshold time value.

In some examples of the method, apparatus, or non-transitory computer-readable medium described above, the first LBT scheme comprises an abbreviated LBT scheme relative to the second LBT scheme. In some examples of the method, apparatus, or non-transitory computer-readable medium described above, the threshold time value corresponds to a remaining time within a current transmission opportunity (TxOP).

In some examples of the method, apparatus, or non-transitory computer-readable medium described above, the threshold time value corresponds to a remaining time within a current LBT frame. In some examples of the method, apparatus, or non-transitory computer-readable medium described above, the one or more timing parameters comprise one or more of a threshold time value, a channel reservation duration value, or a LBT frame duration value.

Some examples of the method, apparatus, or non-transitory computer-readable medium described above may further include processes, features, means, or instructions for transmitting the one or more timing parameters to the UE using one or more of a common DL control channel transmission, the UL grant, or RRC signaling. In some examples of the method, apparatus, or non-transitory computer-readable medium described above, the UL resources for the UL transmission are in a subsequent transmission opportunity (TxOP) outside of a current TxOP, and where the method further comprises: transmitting an indication to use a first LBT scheme when a LBT procedure is successfully performed for the subsequent TxOP and to use a second LBT scheme when the LBT procedure is not successfully performed for the subsequent TxOP, the first LBT scheme comprising an abbreviated LBT scheme relative to the second LBT scheme.

In some examples of the method, apparatus, or non-transitory computer-readable medium described above, the indication further comprises one or more of an energy detection threshold or a contention window (CW) size that are to be determined based on a time between a DL transmission that includes the UL grant and the UL resources of the subsequent TxOP.

In some examples of the method, apparatus, or non-transitory computer-readable medium described above, the transmitting the UL grant comprises: transmitting UL resources for UL transmissions in two or more UL subframes, and transmitting an indication of the LBT scheme for use in initiating each UL transmission for each of the two or more UL subframes that is based on associated time differences between receiving the UL grant and the UL resources associated with each UL subframe.

In some examples of the method, apparatus, or non-transitory computer-readable medium described above, the transmitting the UL grant comprises: transmitting the uplink resources in a first subframe, the uplink resources indicating resources of a second subframe that is subsequent to the first subframe. In some cases, the uplink grant may further indicate a starting time for the uplink transmission, such as an indication of a first time between the uplink grant and the beginning of the uplink resources or an indication of a second time between the beginning of the second subframe and the beginning of the uplink resources.

In some examples of the method, apparatus, or non-transitory computer-readable medium described above, the uplink grant may further indicate duration of the uplink grant. The indication of the duration of the uplink grant may be, for example, a first time period associated with a length of the uplink resources, a second time period between the uplink grant and an end of the uplink resources or a third time period between the beginning of the second subframe and the end of the uplink resources. In some examples, the uplink grant may further indicate duration of a TxOP that includes one or more of the first subframe or second subframe. The indication of the duration of the TxOP may be, for example, one or more of an indication of the TxOP duration, a length of one or more downlink bursts within the TxOP, a length of one or more uplink bursts within the TxOP, or a frame structure for the first subframe and second subframe.

In some examples of the method, apparatus, or non-transitory computer-readable medium described above, a trigger may be transmitted to initiate the uplink transmission. The trigger may be, for example, an indication in a broadcast control channel transmission, an indication in a unicast control channel transmission, or an indication in layer-1 signaling. In some examples, the trigger may include an indication that the uplink transmission is to be started or an indication of an uplink subframe location within a transmission opportunity. In some cases, the trigger is transmitted on multiple downlink subframes. In some examples, the trigger may be transmitted following an LBT failure, and the uplink resources may be modified based at least in part on the LBT failure, such as by shifting the uplink resources to a subsequent subframe.

In some examples of the method, apparatus, or non-transitory computer-readable medium described above, the uplink transmission may be received in a TxOP subsequent to a starting TxOP of the uplink resources, and the uplink resources may be modified based at least in part on receiving the uplink transmission in the subsequent TxOP. Such a modification may include, for example, shifting the uplink resources to a subsequent subframe, or disregarding uplink resources within a time period associated with the starting TxOP. In some cases, an indication of an expiration of the uplink grant may be provided, which may be transmitted in the uplink grant, transmitted in semi-static signaling, or configured at the UE, In some examples, the expiration of the uplink grant corresponds to a total transmission length associated with a transmission opportunity for the uplink transmission or an uplink burst length of the uplink resources within the transmission opportunity.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
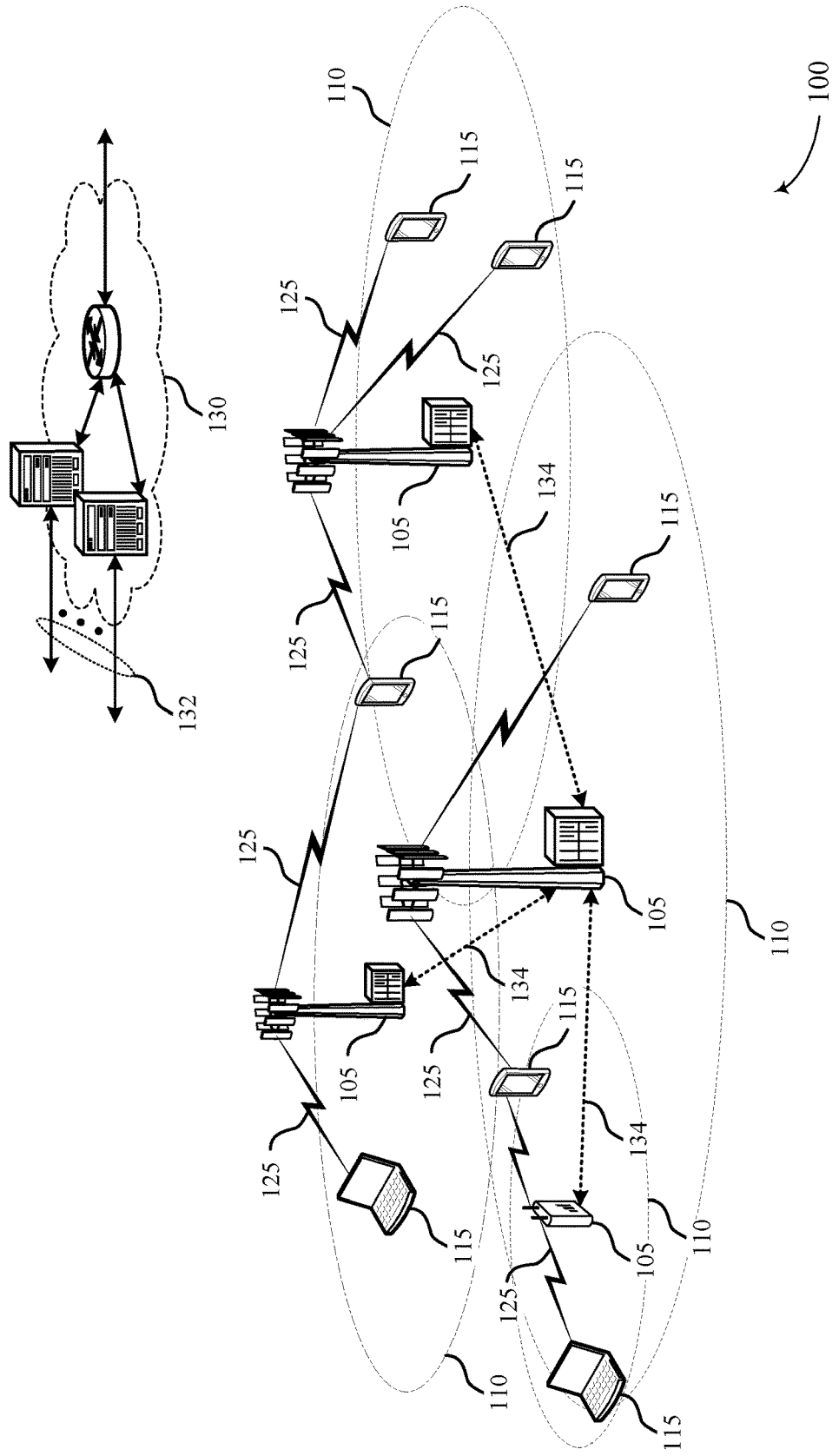
FIG. 1 illustrates an example of a wireless communications system that supports multiple LBT techniques for uplink transmissions in accordance with aspects of the present disclosure.

Techniques are described in which a shared radio frequency spectrum band may be used for communications over a wireless communication system. In some examples, the shared radio frequency spectrum band may be used for LTE/LTE-A communications and may be shared with devices that operate according to different radio access technologies (RATs), such as Wi-Fi devices that operate according to IEEE 802.11 standards, for example. The shared radio frequency spectrum band may be used in combination with, or independent from, a licensed radio frequency spectrum band. The licensed radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access using listen before talk (LBT) procedures (e.g., a radio frequency spectrum band that is available for unlicensed use, such as Wi-Fi use, a radio frequency spectrum band that is available for use by different RATs, or a radio frequency spectrum band that is available for use by multiple operators in an equally shared or prioritized manner).

The present disclosure provides techniques for providing multiple LBT techniques and identification of an LBT technique by a UE for uplink transmissions based on one or more parameters associated with an uplink grant or uplink transmission. As previously indicated, in some examples a base station and a UE may communicate using LTE/LTE-A techniques over a shared radio frequency spectrum band. The LTE/LTE-A techniques may provide that a base station, or other access point, and UE communicate according to a frame structure in which the base station may allocate certain uplink resources of a radio frame to the UE. The UE may then use the allocated uplink resources for uplink transmissions to the base station. In some examples, through the base station LBT procedure, one or more channels of the shared radio frequency spectrum band may be reserved by the base station for the duration of a radio frame. In such cases, uplink transmissions from a UE within the radio frame are within the time period reserved by the base station. However, when using a shared radio frequency spectrum band each transmitter may be required to perform channel contention, and in some examples a UE with uplink resources allocated during the time period reserved by the base station may perform a shortened LBT procedure in which the channel is monitored for a relatively short time period prior to the UE beginning uplink transmissions.

In some examples, a base station may reserve a channel in the shared radio frequency spectrum band for duration of time associated with a transmission opportunity (TxOP), which may correspond to the duration of a radio frame, or one or more integer or non-integer radio frame durations. As previously indicated, the radio frame may include resources for both downlink transmissions from the base station to a UE as well as uplink transmissions from the UE to the base station. Thus, the shortened LBT procedure may be selected if the base station has reserved the channel for the duration of expected UE uplink transmissions, and a full LBT procedure that may be selected if the base station has not reserved the channel for the duration of expected UE uplink transmissions. As mentioned, the full LBT procedure may include detecting energy levels of the channel for a contention window that is longer than the shortened LBT monitoring period and that is determined according to established contention window and backoff determinations.

In some examples, if a time period between a UE receiving a grant of uplink resources and the beginning of the uplink resources is less than a threshold time value, the UE may use the shortened LBT procedure, and otherwise the UE may use the full LBT procedure. In some examples, the base station may explicitly indicate in the uplink grant which LBT scheme a UE is to perform. In such examples, the UE may perform a shortened LBT procedure or a full LBT procedure or skip LBT altogether, based at least in part on the indication included in the uplink grant. In some examples, the uplink grant for the UE may be for uplink resources that are in a different TxOP than the TxOP in which the uplink grant is provided. In some such cases, the UE may monitor the channel to determine if the base station has won channel contention for the different TxOP and perform the shortened LBT procedure if the base station has won channel contention. Furthermore, in some cases, one or more parameters of the LBT procedure performed by the UE may be adjusted based on an elapsed time between the receptions of the uplink grant at the UE and when the UE initiates the LBT procedure.

In some examples, an uplink grant may be transmitted from a base station to a UE. The uplink grant may be transmitted in a first subframe and contain an indication of uplink resources for an uplink transmission from the UE in a second subframe that is subsequent to the first subframe. In some examples, the uplink grant may include an explicit indication to perform a shortened LBT procedure or a full LBT procedure or skip LBT altogether, and the UE may perform a shortened LBT procedure or a full LBT procedure or skip LBT altogether, based at least in part on the indication included in the uplink grant. In some examples, one or more parameters for the uplink transmission may be provided either with the uplink grant or separately from the uplink grant. Such parameters may include, for example, a starting time for the uplink transmission, a duration of the uplink grant (e.g., a number of uplink subframes that the grant covers), a time at which the uplink grant expires, or any combination thereof. In some examples, a base station, after transmitting the uplink grant, may transmit a trigger to initiate the uplink transmission at the UE. The trigger may be transmitted, for example, in a common control channel transmission that is broadcast to multiple UEs, in a unicast control channel transmission to a particular UE, or in layer-1 signaling. In some examples, the uplink resources may be modified based on certain conditions, such as if the trigger is missed and transmitted in a subsequent subframe or if an LBT procedure fails for a TxOP. In some cases, the uplink resources may be modified to truncate the uplink resources to remove resources associated with a time period associated with the missed trigger of LBT failure, or the uplink resources may be modified to shift the resources to subsequent subframes.

Aspects of the disclosure are initially described in the context of a wireless communication system that uses a shared radio frequency spectrum band and LBT procedures for accessing the shared radio frequency spectrum band. Aspects of the disclosure are further illustrated by and described with reference to apparatus diagrams, system diagrams, and flowcharts that relate to LBT techniques for uplink transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network that operates using a shared radio frequency spectrum band. In some examples, the base stations 105 and UEs 115 may use one or more different LBT techniques for accessing the shared radio frequency spectrum band, and selection of an LBT technique by a UE for uplink transmissions may be based on one or more parameters associated with an uplink grant or uplink transmission.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a UE 115 or base station 105 may operate in a shared or unlicensed frequency spectrum. These devices may perform a listen-before-talk (LBT) procedure, such as a clear channel assessment (CCA), prior to communicating in order to determine whether the channel is available. A CCA may include an energy detection procedure to determine whether there are any other active transmissions using a particular channel of the shared radio frequency spectrum band. For example, the device may infer that a change in a received signal strength indication (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence, which may indicate that the channel is occupied and may also indicate a time period associated with transmissions of the other device.

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize a different transmission time interval (TTI) length than other component carriers (CCs), which may include use of a reduced or variable symbol duration as compared with TTIs of the other CCs. The symbol duration may remain the same, in some cases, but each symbol may represent a distinct TTI.

In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.) Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use.

Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARM) related control information.

In various examples base stations 105 and UEs 115 may perform LBT procedures based on one or more parameters associated with a TTI or TxOP, such as a duration of the TTI or TxOP, a duration of time that a base station 105 may reserve a channel, scheduling parameters for uplink transmissions, or successful channel contention by a base station 105 in a subsequent TxOP, to name a few examples. The selection of an LBT procedure may include, in some examples, selection of a shortened LBT if one or more criteria are met, and selection of a full LBT if one or more criteria are not met. For example, if a time period between when a UE 115 receives an uplink grant and the start of uplink resources of the uplink grant is less than a threshold, the UE 115 may assume that the base station 105 has reserved the channel and may perform a shortened LBT procedure. Otherwise, the UE 115 may perform a full LBT procedure.

In some examples, an uplink grant may be transmitted in a first subframe and contain an indication of uplink resources for an uplink transmission from the UE in a second subframe that is subsequent to the first subframe, and one or more parameters for the uplink transmission may be provided, such as a starting time for the uplink transmission, a duration of the uplink grant, a time at which the uplink grant expires, or any combination thereof. In some examples, the uplink grant may include an explicit indication to perform a shortened LBT procedure or a full LBT procedure, and the UE may perform a shortened LBT procedure or a full LBT procedure or skip LBT altogether, based at least in part on the indication included in the uplink grant. In some examples, a base station, after transmitting the uplink grant, may transmit a trigger to initiate the uplink transmission at the UE. The trigger may be transmitted, for example, in a common control channel transmission that is broadcast to multiple UEs, in a unicast control channel transmission to a particular UE, or in layer-1 signaling. The UE, after receiving the trigger, may initiate an uplink transmission by performing a LBT as discussed above, and transmit the uplink transmission.

Figure 2:
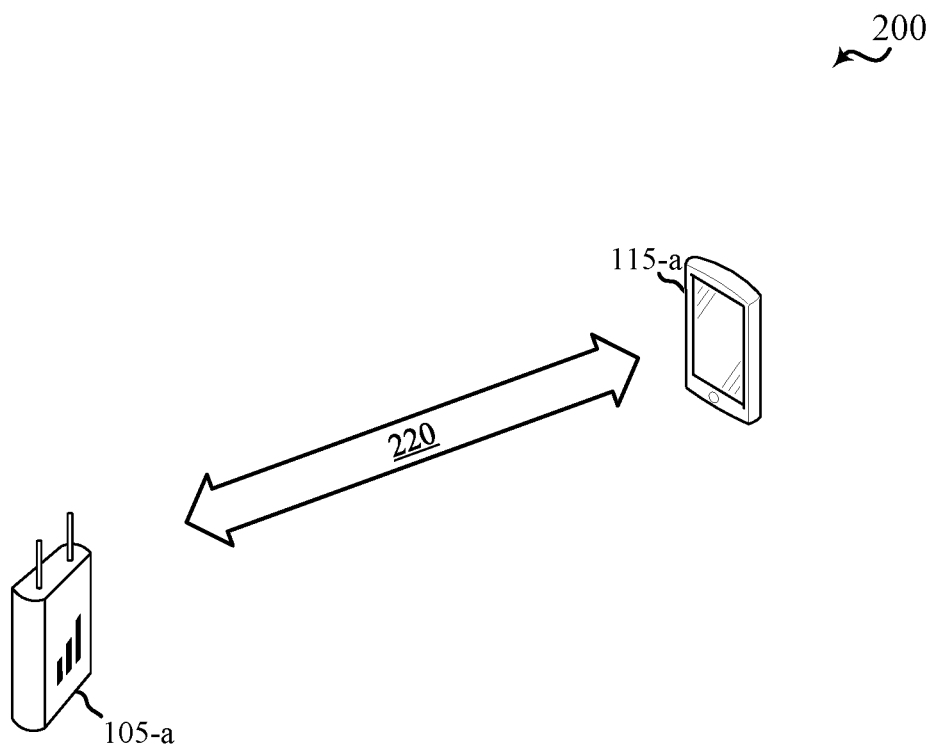
FIG. 2 illustrates an example of a wireless communications system that supports LBT for uplink transmissions in accordance with aspects of the present disclosure.

FIG. 2 illustrates an example of a wireless communications system 200 that may use different LBT techniques according to aspects of the disclosure. Wireless communications system 200 may include base station 105-a and UE 115-a, which may be examples of the corresponding devices described with reference to FIG. 1.

In some examples of the wireless communications system 200, the base station 105-a and UE 115-a may communicate using communications link 220, which may provide for both uplink and downlink communications. The communications link 220, in some examples, may transmit waveforms between the base station 105-a and the UE 115-a using one or more component carriers that may include OFDMA waveforms, SC-FDMA waveforms, or resource block interleaved FDMA waveforms, for example. The communications link 220 may be associated with a frequency in the shared radio frequency spectrum band. This example is presented for illustrative purposes and there may be other similar modes of operation or deployment scenarios that provide LTE/LTE-A communication in a shared radio frequency spectrum band. In some examples, one type of service provider that may benefit from the capacity offload offered by using LTE/LTE-A in a shared radio frequency spectrum band is a traditional mobile network operator (MNO) having access rights to an LTE/LTE-A licensed radio frequency spectrum band. In some examples, base station 105-a may be deployed in a residential, small business, medium business, or enterprise environment, and may allow UE 115-a to establish connections using shared radio frequency spectrum band(s). Such a deployment may allow UE 115-a to operate using shared radio frequency spectrum band and reduce data usage provided to the UE 115-a through licensed radio frequency spectrum bands, which may help reduce costs for a user of UE 115-a in some cases. In some examples, base station 105-a may include hardware for both licensed spectrum access as well as shared spectrum access.

As discussed above, when using shared radio frequency spectrum, the base station 105-a and UE 115-a may perform LBT procedures to determine that one or more channels are available for transmission in the shared radio frequency spectrum band. As also discussed above, the LTE/LTE-A techniques may provide that the base station 105-a and UE 115-a communicate according to a frame structure in which the base station 105-a may allocate certain uplink resources of a radio frame to the UE 115-a. The UE 115-a may then use the allocated uplink resources for uplink transmissions to the base station 105-a. In some examples, through the base station 105-a LBT procedure, one or more channels of the shared radio frequency spectrum band may be reserved by the base station 105-a for the duration of a radio frame. In such cases, uplink transmissions from the UE 115-a within the radio frame are within the time period reserved by the base station 105-*a*, and the UE 115-*a* may perform a shortened LBT procedure.

In some deployments, an uplink grant to a UE 115-*a* may be provided by the base station 105-*b*, in which the uplink resources are located in a defined position relative to the downlink resources that were used to provide the uplink grant (e.g., four subframes following the downlink subframe that included the uplink grant). In order to provide enhanced flexibility, some examples of the present disclosure provide that the uplink resources may be located at different locations relative to the downlink resources used to provide the uplink grant. Such flexibility may provide the base station 105-*a* with more scheduling options for different devices, and allow for enhanced efficiency for the wireless communications system 200. Furthermore, in some examples, uplink resources may be provided in an uplink grant that are not within a same TxOP as the grant itself, which may provide further flexibility to the base station 105-*a*. In some examples, if the uplink grant is within the same TxOP, the base station 105-*a* may choose to reserve the medium for the UL duration as well as for downlink transmissions from the base station 105-*a*, and the UE 115-*a* may then perform a shortened LBT procedure. In some examples, the base station 105-*a* may provide an indication of whether the medium is reserved for the uplink transmissions of the UE 115-*a*, such as through providing a time threshold following the receipt of an uplink grant during which the UE 115-*a* may perform a shortened LBT procedure. Such a time threshold may correspond to a duration of a radio frame, for example, which may also correspond to a TxOP duration. In some examples, the time threshold may be provided with the uplink grant, or may be provided in other signaling of the base station 105-*a*, such as common physical downlink control channel (PHCCH) signaling. In further examples, such a time threshold may be defined in a standard or specification, statically configured by the base station 105-*a*, or semi-statically configured by the base station 105-*a* (e.g., through radio resource control (RRC) signaling).

In examples where an uplink grant is outside of a current TxOP, the base station 105-*a*, in the subsequent TxOP that contains the uplink grant, may contend for channel access and if it wins contention may again reserve the channel for the duration of the scheduled uplink transmissions of the subsequent TxOP. In such cases, UE 115-*a* may monitor the channel and if transmissions from the base station 105-*a* are detected, the UE 115-*a* may perform the shortened LBT procedure. For example, the UE 115-*a* may monitor for a cell-specific reference signal (CRS) of the base station 105-*a* during the subsequent TxOP. If the CRS of base station 105-*a* is detected, the UE 115-*a* may perform the shortened LBT, and otherwise perform a full LBT procedure.

Figure 3:
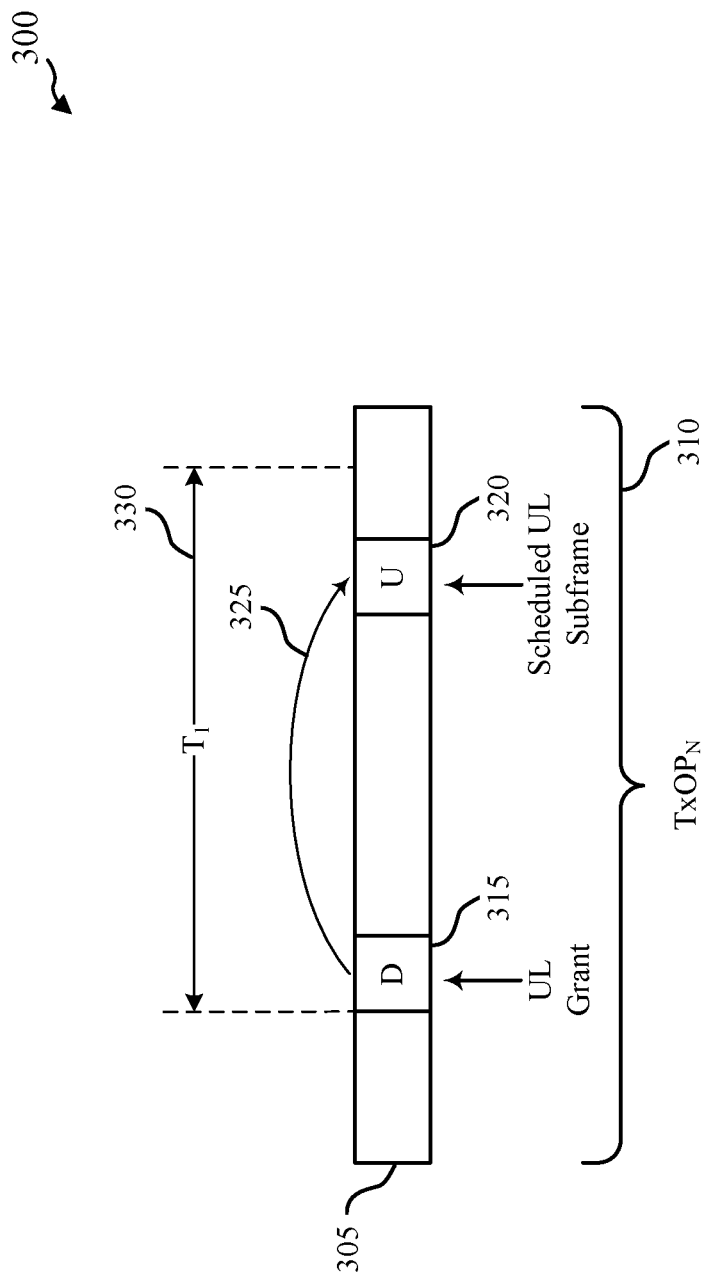
FIG. 3 illustrates an example of an uplink grant and uplink transmission within a transmission opportunity (TxOP) in accordance with aspects of the present disclosure.

FIG. 3 illustrates an example of communications 300 between a base station and a UE. In some cases, communications 300 may represent aspects of techniques performed by a UE 115 or base station 105 as described with reference to FIGS. 1-2. In the example of FIG. 3, a radio frame 305 may be transmitted between a UE (e.g., UE 115 of FIGS. 1-2) and a base station (e.g., base station 105 of FIGS. 1-2) during a TxOP 310. Within the radio frame 305, a downlink subframe 315 may include an uplink grant that provides uplink resources in an uplink subframe 320 of the radio frame 305. As indicated above, in some examples the time difference 325 between the downlink subframe 315 and the scheduled uplink subframe 320 may not be a fixed time duration. In some examples, a time period $T_1$ 330 may be established, and if the uplink resources of the scheduled uplink subframe 320 are within time $T_1$ of the downlink subframe 315 that includes the uplink grant, the UE may assume that the base station reserved the medium for the uplink subframe 320, and may perform a shortened LBT procedure.

In some examples, the uplink subframe 320 may be outside of the time period $T_1$ 330, and in such cases the UE may not assume that the base station has reserved the medium because the uplink subframe 320 of the UL grant likely is outside of the current TxOP associated with downlink subframe 315. Accordingly, the UE may perform a full LBT (e.g., a full eCCA countdown based on contention window and backoff according to established LBT procedures) in this instance before transmitting the scheduled UL subframe 320. Such a full LBT may be performed, for example, under the assumption that the base station did not reserve the medium for the uplink subframe 320. As indicated above, the base station may indicate the time period $T_1$ 330 in the uplink grant, or the time period $T_1$ 330 may be applicable to an entire LBT frame and indicated via the common physical downlink control channel (PDCCH), for example. In some examples, a separate time period $T_1$ may not be explicitly signaled by the base station, and the UE may use the shortened LBT procedure so long as the uplink subframe 320 is within the same TxOP 310 as the uplink grant provided in downlink subframe 315. In some examples, the LBT frame structure may be provided in the common PDCCH. In further examples, a combination of a time duration and same TxOP may be used to select the shortened LBT or full LBT.

Figure 4:
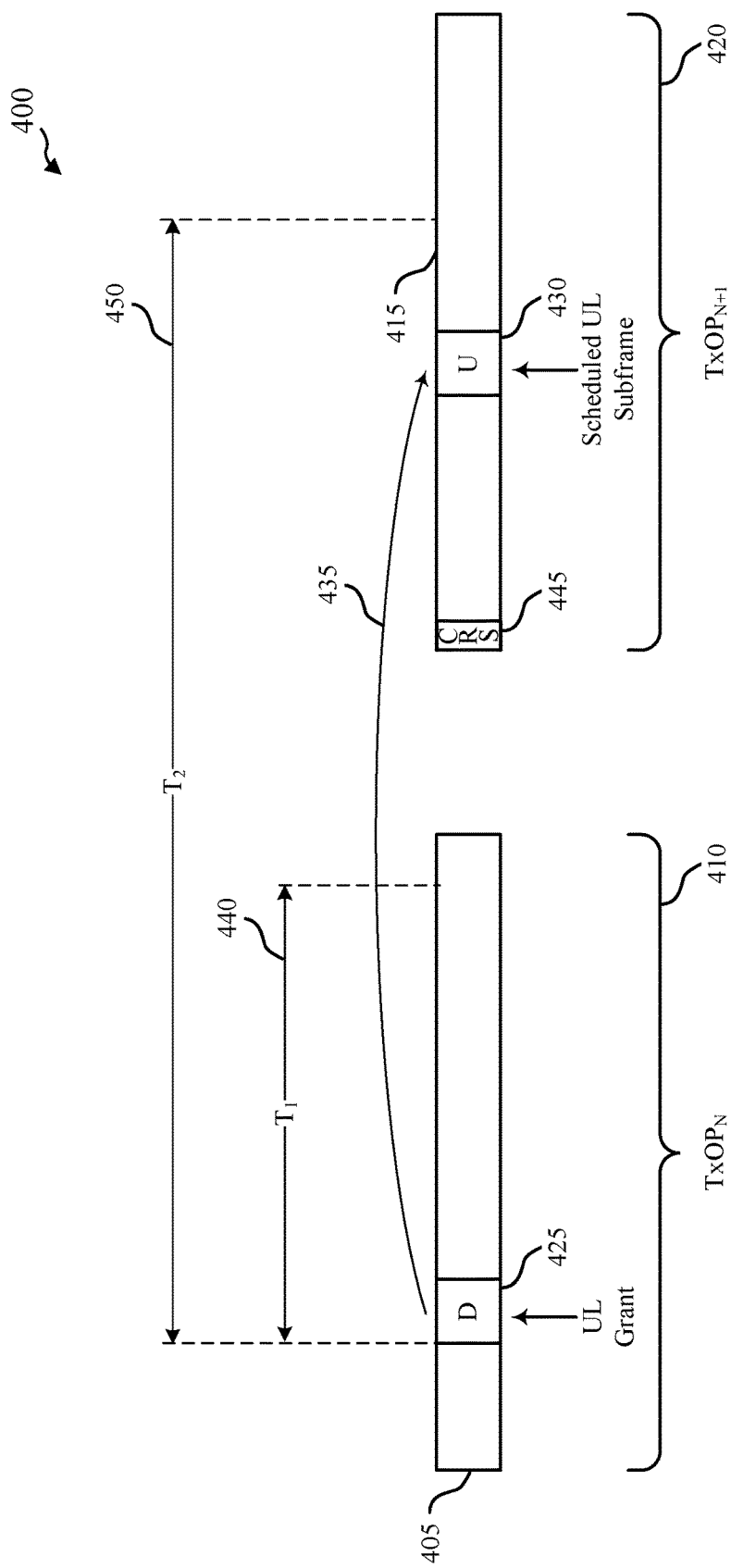
FIG. 4 illustrates an example of an uplink grant and uplink transmission within a subsequent TxOP in accordance with aspects of the present disclosure.

FIG. 4 illustrates an example of communications 400 using multiple radio frames in which an uplink grant is for uplink resources in a subsequent TxOP, in accordance with aspects of the present disclosure. In some cases, communications 400 may represent aspects of techniques performed by a UE 115 or base station 105 as described with reference to FIGS. 1-2.

In the example of FIG. 4, a first radio frame 405 may be transmitted between a UE (e.g., UE 115 of FIGS. 1-2) and a base station (e.g., base station 105 of FIGS. 1-2) during a first TxOP 410, and a second radio frame 415 may be transmitted between the UE and the base station during a second TxOP 420. Within the radio frame 405, a downlink subframe 425 may include an uplink grant that provides uplink resources in an uplink subframe 430 of the second radio frame 415 in the second TxOP 420. In some examples, time period $T_1$ 440 may be provided, and if the uplink transmission is within the time period $T_1$ 440, the UE may perform a shortened LBT procedure. In the example of FIG. 4, the uplink subframe 430 with the scheduled uplink resources is in a different TxOP, namely second TxOP 420, and is outside of the time period $T_1$ 440. In some examples, the UE may simply perform a full LBT if the scheduled uplink resources are outside of the time period $T_1$ 440. In other examples, as indicated in FIG. 4, the base station may attempt to win channel contention in the second TxOP 420, and if successful may transmit in the second radio frame 415, and the UE may monitor for transmissions from the base station. In some examples, the base station may transmit a CRS 445 in the second radio frame 415. The base station, when performing the LBT procedure for the second TxOP 420, may reserve the medium for the duration of the second radio frame 415. The UE may monitor for the CRS 445 of the base station (or other base station transmission), and if it is detected may perform a shortened LBT procedure prior to transmitting uplink communications in uplink subframe 430. If the CRS 445 or other transmission of the base station is not detected by the UE, the UE may perform a full LBT procedure and attempt uplink transmission in the second TxOP 420.

In some examples, the UE may wait until the CRS 445 of the base station is detected before attempting to transmit the uplink subframe 430, and may always perform a shortened LBT procedure. Because the time of the second TxOP 420 may not be known, some examples may provide a second time duration $T_2$ 450, and if the uplink subframe 430 is not scheduled within the time duration $T_2$ 450 of the uplink grant, the UE may perform a full LBT procedure before transmitting the scheduled uplink subframe 430. In further examples, the base station may preclude the UE from performing a shortened LBT if the uplink subframe 430 is outside of the first TxOP 410, outside of the time period $T_2$ 450, or a combination of both. The base station may provide signaling of different parameters to use for determining an LBT scheme to use, such as an indication of whether to use shortened LBT or full LBT procedures, and time periods $T_1$ 440 and $T_2$ 450.

In the event that the UE is to perform a full LBT, the UE may use energy threshold parameters and contention window size that may be determined based on one or more factors. In some examples, the UE may use the latest full LBT parameters used for the last full eCCA operation for uplink transmissions. In other examples, the LBT parameters may be a function of time gap 435 between the grant of the uplink resources in downlink subframe 425 and the scheduled uplink subframe 430 and/or duration of the uplink grant. For example, the longer the uplink grant duration, the longer the contention window size may be. In some examples, the contention window size may be adjusted based on the time gap 435 between the downlink subframe 425 with the uplink grant and the scheduled uplink subframe 430. In further examples, the base station may provide an indication of LBT parameters to use for full and/or shortened LBT procedures.

Figure 5A:
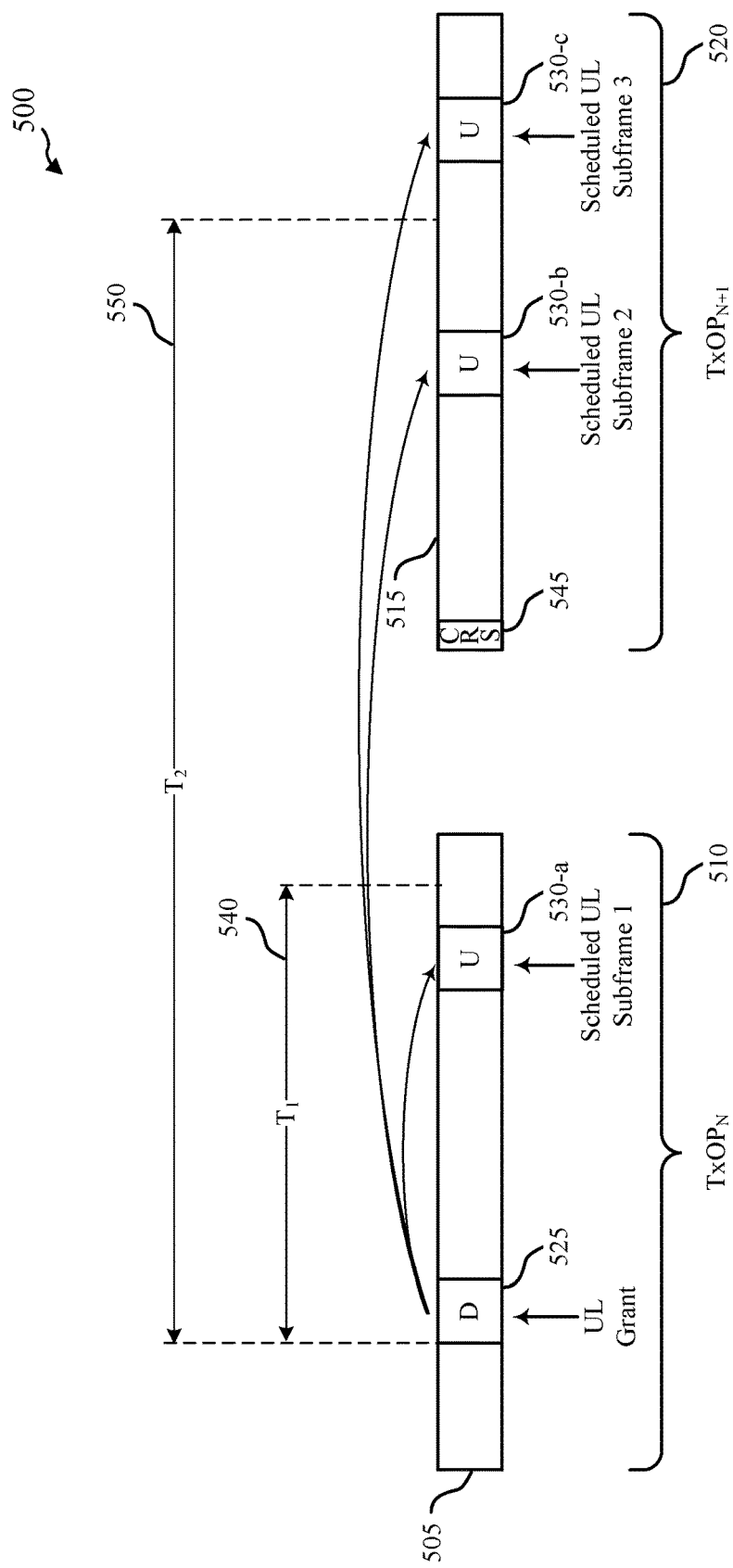
FIG. 5A illustrates an example of an uplink grant for multiple uplink transmission within a same or subsequent TxOP in accordance with aspects of the present disclosure.

FIG. 5A illustrates an example of communications 500 using multiple radio frames in which multiple uplink grants may be provided for uplink resources in a same or subsequent TxOP, in accordance with aspects of the present disclosure. In some cases, communications 500 may represent aspects of techniques performed by a UE 115 or base station 105 as described with reference to FIGS. 1-2.

In the example of FIG. 5A, a first radio frame 505 may be transmitted between a UE (e.g., UE 115 of FIGS. 1-2) and a base station (e.g., base station 105 of FIGS. 1-2) during a first TxOP 510, and a second radio frame 515 may be transmitted between the UE and the base station during a second TxOP 520. Within the radio frame 505, a downlink subframe 525 may include an uplink grant that provides uplink resources in multiple uplink subframes 530-*a*, 530-*b*, and 530-*c*. In the example of FIG. 5A, uplink subframe 530-*a* is in the first radio frame 505 in the first TxOP 510, and the uplink subframes 530-*b* and 530-*c* are in the second radio frame 515 in the second TxOP 520. In some examples, time period $T_1$ 540 may be provided, and if the uplink transmission is within the time period $T_1$ 540, the UE may perform a shortened LBT procedure. In the example of FIG. 5A, the uplink subframe 530-*a* is within the time period $T_1$ 540, and uplink subframes 530-*b* and 530-*c* are in a different TxOP, namely second TxOP 520, and is outside of the time period $T_1$ 540. Similarly as discussed above, in some examples the UE may simply perform a full LBT if the scheduled uplink resources are outside of the time period $T_1$ 540. In other examples, as indicated in FIG. 5A, the base station may attempt to win channel contention in the second TxOP 520, and if successful may transmit in the second radio frame 515, and the UE may monitor for transmissions from the base station. In some examples, the base station may transmit a CRS 545 in the second radio frame 515. The base station, when performing the LBT procedure for the second TxOP 520, may reserve the medium for the duration of the second radio frame 515. The UE may monitor for the CRS 545 of the base station (or other base station transmission), and if it is detected may perform a shortened LBT procedure prior to transmitting uplink subframes 530-*b* and 530-*c*. If the CRS 545 or other transmission of the base station is not detected by the UE, the UE may perform a full LBT procedure and attempt uplink transmissions in the second TxOP 520. Further, similarly as discussed above, in some examples a second time period $T_2$ 550 may be provided, and the UE may perform a full LBT if the uplink subframe is outside of the time period $T_2$ 550, as indicated in the example of FIG. 5A for uplink subframe 530-*c*.

Providing such cross TxOP grants may help to reduce overhead, by indicating multiple uplink subframes in one grant, and thereby enhance network efficiency. In some examples, the duration of the uplink grant, in the number of subframes, may be signaled in the uplink grant or implicitly derived based on the uplink grant. Similarly, in some examples the resources within each uplink subframe 530 may be signaled in the uplink grant or implicitly derived based on the uplink grant. In examples where the number of subframes is implicitly derived based on the uplink grant, the number of uplink subframes 530 may be linked to a previous uplink grant (for example, for transmission in $TxOP_N$ 510), with the starting subframe number being the only difference for the cross TxOP grant. In further examples, cross TxOP grants may be limited to one subframe.

Figure 5B:
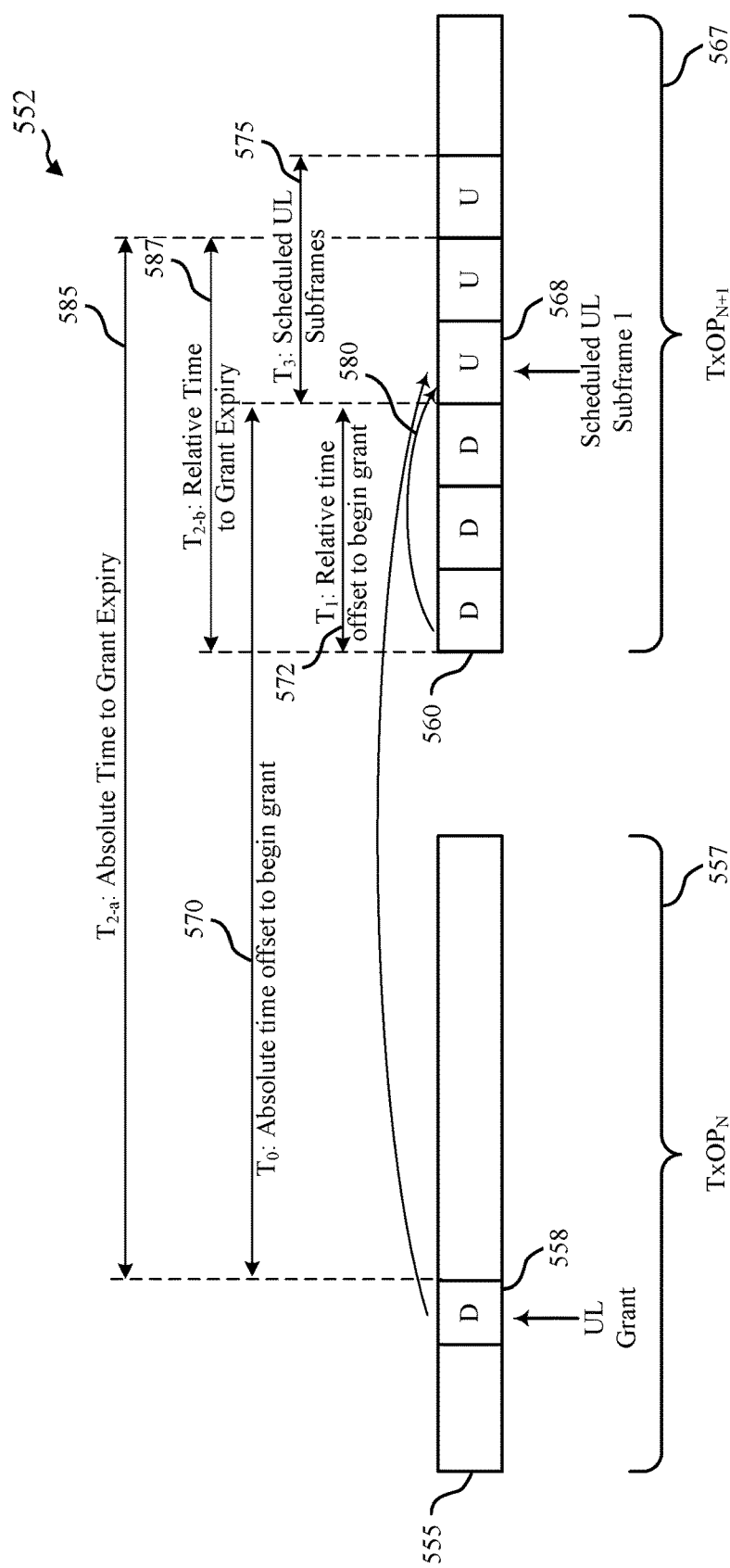
FIG. 5B illustrates an example of a cross-TxOP uplink grant for uplink transmissions within a subsequent TxOP in accordance with aspects of the present disclosure.

FIG. 5B illustrates an example of communications 552 having a cross-TxOP uplink grant for uplink transmissions within a subsequent TxOP in accordance with aspects of the present disclosure. In some cases, communications 552 may represent aspects of techniques performed by a UE 115 or base station 105 as described with reference to FIGS. 1-2.

In the example of FIG. 5B, a first radio frame 555 may be transmitted between a UE (e.g., UE 115 of FIGS. 1-2) and a base station (e.g., base station 105 of FIGS. 1-2) during a first TxOP 557, and a second radio frame 560 may be transmitted between the UE and the base station during a second TxOP 567. Within the radio frame 555, a downlink subframe 558 may include an uplink grant that provides uplink resources in an uplink subframe 568 of the second radio frame 560.

The uplink grant may include an indication of uplink resources to be used for an uplink transmission. In some examples, the uplink grant may include an explicit indication to perform a shortened LBT procedure or a full LBT procedure or skip LBT altogether, and the UE may perform a shortened LBT procedure or a full LBT procedure or skip LBT altogether, based at least in part on the indication included in the uplink grant. In some cases, the uplink grant may also include an indication of a starting time of uplink transmission, which may be a starting time of uplink subframe 568. In some examples, the uplink grant may include an absolute time $T_0$ from the time of issue of the grant until the start of the uplink transmission, indicated as 570 in FIG. 5B. In some examples, the uplink grant may include a relative time $T_1$ from the start of the second TxOP 567 until the start of the uplink transmission, indicated as 572 in FIG. 5B. In some examples, the relative time $T_1$ may be used if it is expected that the start of the second TxOP 567 may not occur at a predetermined time due to uncertainty as to when the base station can obtain access to the medium (e.g., to accommodate for one or more LBT failures before the base station wins contention to the wireless medium).

The uplink grant may also include an indication of a duration of the uplink grant. In the example of FIG. 5B, the duration of the uplink grant may be time period $T_3$ 575. In some examples, the duration of the uplink grant may be indicated in the uplink grant as a duration of uplink transmissions $T_3$ 575. In other examples, the duration of the uplink grant may be measured relative to the time of issue of the grant, or may be measured relative to the time of the start of the second TxOP 567. In some examples, a frame structure for the first radio frame 555 or second radio frame 560 may be used in conjunction with the indication of the duration of the uplink grant to determine the duration of uplink transmissions $T_3$ 575. In some examples, the uplink grant may also include a total TxOP length, a length of the downlink bursts and uplink bursts, or an exact frame structure for the TxOPs 557 or 567. A UE may use such information to determine timings for initiating the uplink transmissions.

A base station may also transmit a trigger 580 for the uplink grant, and the UE, upon receiving the trigger 580, may initiate the uplink transmission in uplink subframe 568. For example, the UE may initiate an uplink transmission by performing a LBT procedure, as discussed above, and transmitting the uplink transmission upon successful completion of the LBT procedure. The trigger 580 may be provided, for example, in a common-PDCCH (C-PDCCH) transmission that is broadcast to multiple UEs, or in unicast UE-specific signaling such as unicast PDCCH or layer-1 signaling (e.g., using physical hybrid ARQ indicator channel (PHICH) resources). The trigger 580 may indicate either a "GO" signal to the UE to initiate uplink transmissions immediately, or the trigger 580 may be an indication that an upcoming subframe (e.g., a subframe starting at time T plus an number of integer subframes) is an uplink subframe. In some examples, the trigger 580 may be transmitted on multiple downlink subframes for additional redundancy/reliability.

In some examples, a UE may be provided with information related to an expiration of an uplink grant. Such an expiration may be indicated, for examples, as an absolute time to grant expiry $T_{2-a}$ 585, or may be indicated as a relative time to grant expiry $T_{2-b}$ 87. In some examples, the uplink grant may include an indication of uplink grant expiration, thus allowing dynamic signaling of the grant expiration. In other examples, a base station may provide semi-static signaling (e.g., via RRC signaling) that indicates uplink grant expiration. In sill other examples, a base station may configure uplink grant expiration statically.

As indicated above, a base station and a UE may operate using a shared radio frequency spectrum band. Such operation may result in uncertainty that the wireless medium will be available for both $TxOP_N$ 557 and $TxOP_{N+1}$ 567. Thus, in some cases, following an uplink grant, the trigger 580 may not be transmitted in the next consecutive TxOP, but may be transmitted following a subsequent LBT procedure. Furthermore, a UE may experience interference during all or a portion of $TxOP_{N+1}$ 567, which may result in the UE missing the trigger 580. Thus, following an uplink grant that provides for a starting time of N, it may occur that the trigger 580 (e.g. C-PDCCH signaling that N is an uplink subframe) does not arrive in a timely fashion. In some examples, a UE may shift the entirety of the uplink resources to a subsequent subframe. A base station may thus perform LBT procedures and expect that the UE will simply delay scheduled uplink transmissions based on when the base station has a successful LBT. In some examples, a UE may drop, or truncate, the uplink resources associated with the delay (e.g. modify the uplink resources to include only resources in a second and third subframe rather than uplink resources in a first through third subframe). In some cases, the UE may select whether to delay the uplink resources or drop certain uplink resources based at least in part on determining whether the delayed trigger is due to a LBT failure at the base station or interference experiences at the UE.

Furthermore, in some cases, even after receiving the trigger 580 at the UE, the UE may fail to win the medium due to LBT failure. In such situations, the UE may modify the uplink resources in a similar manner as discussed above, such as by shifting the entirety of the uplink resources to a subsequent subframe or dropping the uplink resources associated with the delay. In either case of LBT or trigger reception uncertainty, a UE may determine the duration of uplink transmission subject to not exceeding the total TxOP length, or not exceeding the uplink burst length 575 assigned for that TxOP.

Additionally or alternatively, various techniques may be employed for handling multiple UEs. For example, the starting time for uplink transmission may be different for different UEs. In some cases, the duration of the grant is different for different UEs. An offset between a grant and a transmission time may be transmitted to and used by UEs to determine when to begin transmissions in a subsequent TxOP. By way of example, a common time offset may be employed or a UE-specific time offset may be employed.

In cases in which a common time offset is employed, the common time offset may specify the start time of the next TxOP. The offset may be common to some or all UEs within a system. The common time offset may be measured from a subframe that contains a grant or it may be measured relative to the end of a current TxOP. The common time offset may be measured to the start of the subsequent TxOP or it may be measured to the start of an uplink burst of a subsequent TxOP. In some cases, the common offset is measured to the trigger that activates a cross-TxOP grant. In some examples, the common time offset is carried in the uplink grant. In some cases, the common offset is signaled in a common control channel, such as a common PDCCH.

In cases in which a UE-specific time offset is employed, the UE-specific time offset may specify the start of each UE's starting time of an uplink transmission. The UE-specific time offset may be measured relative to the first uplink subframe of a subsequent TxOP, or it may be measured relative to the start of a subsequent TxOP. In some cases, it is measured relative to a trigger that activates a cross-TxOP grant. In some examples, the UE-specific offset is measured relative to a subframe in the current TxOP that includes the grant, or it may be measured relative to the current TxOP that includes the grant. A UE-specific time offset may be employed in combination with a common offset. In some cases, the UE-specific offset is used to the exclusion of a common offset. The UE-specific offset may be signaled in an uplink grant or in a common control channel, such as a common PDCCH. When signaled in a common control channel, a group trigger signal may be employed.

To facilitate handling (e.g., scheduling) multiple UEs, a base station may choose to enable or disable previously issued cross-TxOP grants in different situations. For example, a base station may evaluate resources utilized by previous grants, analyze prior responses received from the UE, and/or may consider various scheduling decisions to determine whether to enable or disable a prior cross-TxOP grant.

Enabling or disabling prior cross-TxOP grants may be done on a per-UE basis and may be done using group trigger signals. For example, a group trigger signal may be carried in a trigger subframe in the subsequent TxOP. An enable/disable signal may be transmitted in a common control channel, such as a common PDCCH. For instance, a common PDCCH may include a field that triggers previous cross-TxOP grants. By way of example, for each UE, a single bit may be used to indicate that a grant is enabled or disabled. Or in some examples, for each UE, multiple bits may be used to convey information in addition to an enabled/disabled grant, such as timing offsets, length of a grant, or the like.

Figure 5C:
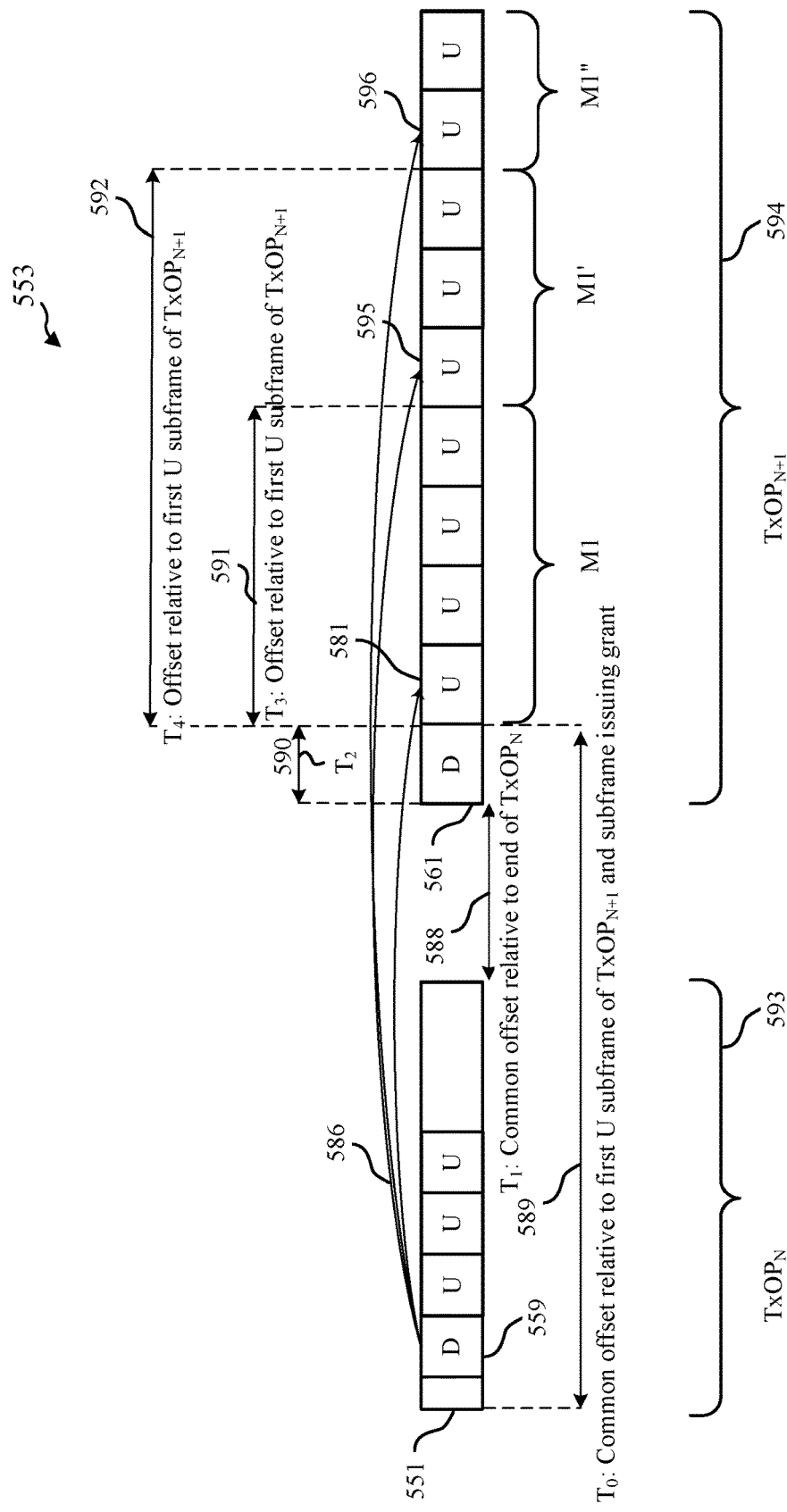
FIG. 5C illustrates an example of a cross-TxOP uplink grant for uplink transmissions within a subsequent TxOP, wherein various techniques may be employed for handling multiple UEs, in accordance with aspects of the present disclosure.

FIG. 5C illustrates an example of a communications 553 having a cross-TxOP uplink grant for uplink transmissions within a subsequent TxOP, wherein various techniques may be employed for handling multiple UEs in accordance with aspects of the present disclosure. In some cases, communications 553 may represent aspects of techniques performed by a UE 115 or base station 105 as described with reference to FIGS. 1-2.

In the example of FIG. 5C, a first radio frame 551 may be transmitted between a UE (e.g., UE 115 of FIGS. 1-2) and a base station (e.g., base station 105 of FIGS. 1-2) during a current TxOP 593, and a second radio frame 561 may be transmitted between the UE and the base station during a subsequent TxOP 594. Within the radio frame 551, a downlink subframe 559 may include an uplink grant that provides uplink resources in an uplink subframe, such as uplink subframe 581, uplink subframe 595, and uplink subframe 596 of the second radio frame 561.

The uplink grant may include an indication of uplink resources to be used for an uplink transmission. In some examples, the uplink grant may include an explicit indication to perform a shortened LBT procedure or a full LBT procedure or skip LBT altogether, and the UE may perform a shortened LBT procedure or a full LBT procedure or skip LBT altogether, based at least in part on the indication included in the uplink grant. In some cases, the uplink grant may also include an indication of a starting time of uplink transmission, which may be a starting time of uplink subframe 581, uplink subframe 595, or uplink subframe 596.

In some examples, the base station may transmit a trigger 586 to the UE, and a UE, upon receiving the trigger 586, may initiate the uplink transmission in uplink subframe 581, uplink subframe 595, or uplink subframe 596. For example, the UE may initiate an uplink transmission by performing a LBT procedure, as discussed above, and transmitting the uplink transmission (e.g., M1, M1', or M1") upon successful completion of the LBT procedure. The trigger 586 may be provided, for example, in a common-PDCCH (C-PDCCH) transmission that is broadcast to multiple UEs, or in unicast UE-specific signaling such as unicast PDCCH or layer-1 signaling (e.g., using physical hybrid ARQ indicator channel (PHICH) resources). The trigger 586 may indicate either a "GO" signal to the UE to initiate uplink transmissions immediately, or the trigger 586 may be an indication that an upcoming subframe (e.g., a subframe starting at time T plus an number of integer subframes) is an uplink subframe. In some examples, the trigger 586 may be transmitted on multiple downlink subframes for additional redundancy/reliability. In some examples, the trigger 586 may be included in downlink subframe 561.

In some examples, various techniques may be employed for handling multiple UEs. In such examples, the starting time for uplink transmission may be different for different UEs. The starting time for uplink transmissions M1 for a first UE may be uplink subframe 581, while the starting time for uplink transmission M1' for a second UE may be subframe 595, and the starting time for uplink transmission M1" for a third UE may be subframe 596. In some examples, the duration of the grant is different for different UEs. An offset between a grant and a transmission time may be transmitted to and used by UEs to determine when to begin transmissions in a subsequent TxOP. By way of example, a common time offset may be employed or a UE-specific time offset may be employed.

In cases in which a common time offset is employed, the common time offset may specify the start time of the next TxOP. The offset may be common to some or all UEs within a system. For example, common time offset 588 may be measured from the end of a current TxOP 593. Common time offset 588 may be measured to the start of subsequent TxOP 594. Alternatively or additionally, common offset 589 may be measured from a subframe 559 that contains a grant. Common offset 589 may be measured relative to the first uplink subframe of subsequent TxOP 594, or it may be measured to the start of an uplink burst such as uplink subframe 595 or uplink subframe 596 of subsequent TxOP 594. In some cases, the common offset is measured to the trigger that activates a cross-TxOP grant, which may be included in a downlink subframe such as subframe 561. In some examples, the common time offset is carried in the uplink grant. In some cases, the common offset is signaled in a common control channel, such as a common PDCCH.

In cases in which a UE-specific time offset is employed, the UE-specific time offset may specify the start of each UE's starting time of an uplink transmission. The UE-specific time offset may be measured relative to the first uplink subframe 581 of a subsequent TxOP 594, or it may be measured relative to the start of a subsequent TxOP 594. In some cases, it is measured relative to a trigger that activates a cross-TxOP grant. A base station may transmit a trigger 586 for the uplink grant included in downlink subframe 559, or the trigger may be included in downlink subframe 561. For example, UE-specific time offset 590 may be specific to a first UE uplink transmission M1, and may be measured relative to the start of subsequent TxOP 594. UE-specific time offset 591 may be specific to a second UE uplink transmission M1', and may be measured relative to the first uplink subframe 569 of subsequent TxOP 594. UE-specific time offset 592 may be specific to a third UE uplink transmission M1", and may be measured relative to the first uplink subframe 569 of subsequent TxOP 594.

In some examples, offset relative to a UE-specific time offset may be employed in combination with a common offset. In some cases, the UE-specific offset is used to the exclusion of a common offset. The UE-specific offset may be signaled in an uplink grant, which may be included in downlink subframe 559. The UE-specific offset may also be signaled in a common control channel, such as a common PDCCH. When signaled in a common control channel, a group trigger signal may be employed.

Figure 6A:
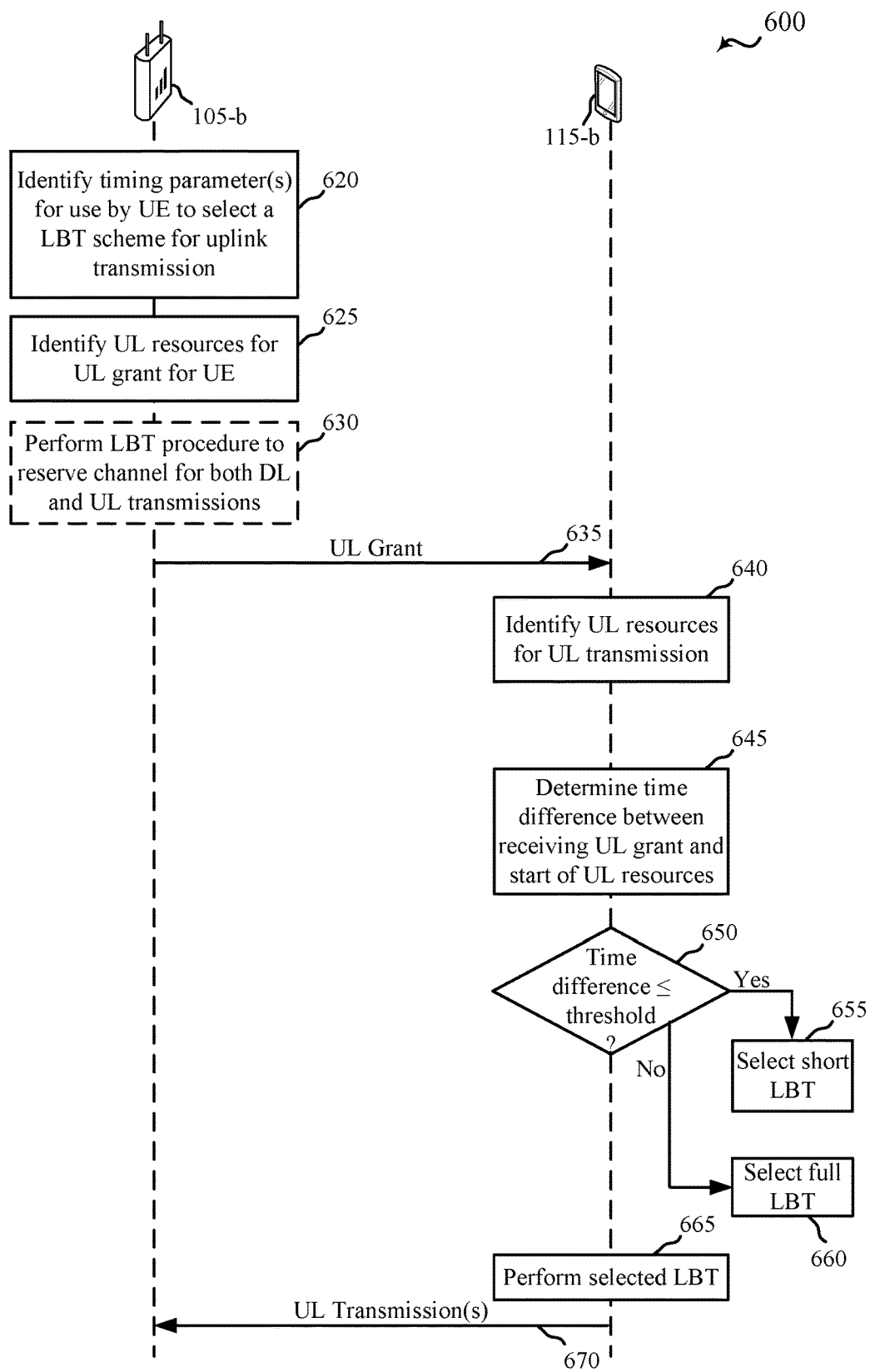
FIG. 6A illustrates an example of a process flow in a system that supports multiple LBT techniques for uplink transmissions in accordance with aspects of the present disclosure.

FIG. 6A illustrates an example of a process flow 600 for LBT for uplink transmissions in accordance with various aspects of the present disclosure. Process flow 600 may include base station 105-b and UE 115-b, which may be examples of the corresponding devices described with reference to FIG. 1-2.

At block 620, the base station 105-b may identify timing parameter(s) for use by UE 115-b to select a LBT scheme for uplink transmission. Such timing parameters may include, for example, time periods $T_1$ and $T_2$ as discussed above, or an indication that the timing corresponds to a TxOP duration or LBT radio frame duration. At block 625, the base station 105-b may identify uplink resources for an uplink grant for the UE 115-b. At optional block 630, the base station may perform an LBT procedure to reserve channel for both downlink and uplink transmissions. In some examples, the base station 105-b may only reserve the channel for downlink transmissions, and may adjust one or more timing parameters for the uplink LBT accordingly. The base station 105-b may transmit uplink grant 635 to the UE 115-b in a downlink subframe.

At block 640, the UE 115-b may identify the uplink resources for the subsequent uplink transmission of the UE 115-b to the base station 105-b. At block 645, the UE 115-b may determine a time difference between receiving the uplink grant and the start of the uplink resources. At block 650, the UE 115-b may determine if the time difference is less than or equal to a threshold. The threshold may be determined, for example, at least in part on the timing parameters identified at block 620 (which may be transmitted to the UE 115-b in the uplink grant 635 or in other signaling to the UE 115-b). If the time difference is less than or equal to the threshold, the UE 115-b may select a shortened LBT procedure, as indicated at block 655. If the time difference is greater than the threshold, the UE 115-b may select a full LBT procedure, as indicated at block 660. At block 665, the UE 115-b may perform the selected LBT procedure, and if the UE 115-b wins contention the UE 115-b may transmit uplink transmission(s) 670 to the base station 105-b.

Figure 6B:
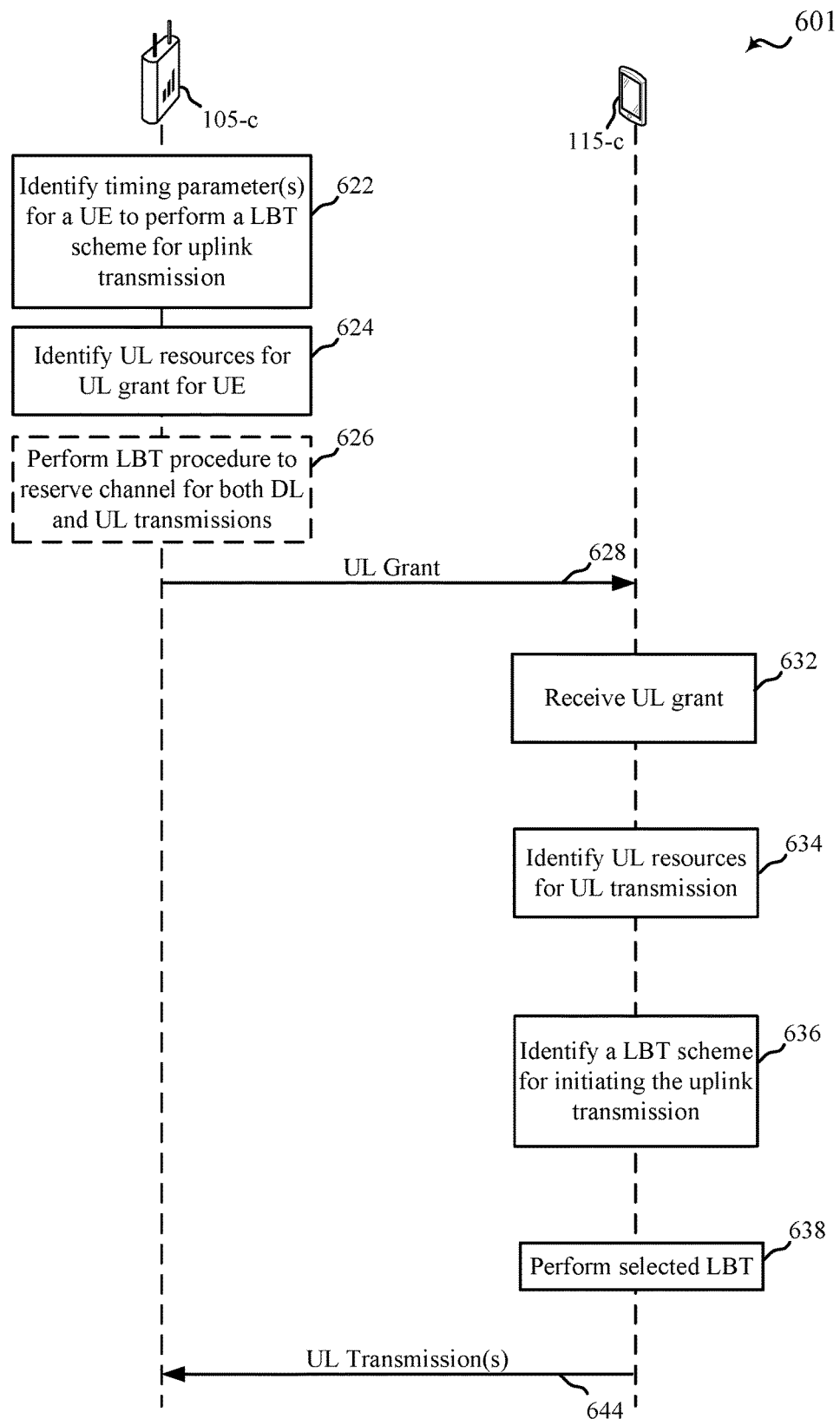
FIG. 6B illustrates an example of a process flow in a system that supports multiple LBT techniques for uplink transmissions in accordance with aspects of the present disclosure.

FIG. 6B illustrates an example of a process flow 601 for LBT for uplink transmissions in accordance with various aspects of the present disclosure. Process flow 601 may include base station 105-c and UE 115-c, which may be examples of the corresponding devices described with reference to FIGS. 1-2.

At block 622, the base station 105-c may identify timing parameter(s) for a UE to perform a LBT scheme for uplink transmission. Such timing parameters may include, for example, time periods $T_1$ and $T_2$ as discussed above, or an indication that the timing corresponds to a TxOP duration or LBT radio frame duration. At block 624, the base station 105-c may identify uplink resources for an uplink grant for the UE 115-c. At optional block 626, the base station 105-c may perform an LBT procedure to reserve channel for both downlink and uplink transmissions. In some examples, the base station 105-c may only reserve the channel for downlink transmissions, and may adjust one or more timing parameters for the uplink LBT accordingly. The base station 105-c may transmit uplink grant 628 to the UE 115-c in a downlink subframe.

At block 632, the UE 115-c may receive an uplink grant identifying uplink resources for an uplink transmission. At block 634, UE 115-c may identify a LBT scheme for initiating the uplink transmission based at least in part on information received in the uplink grant. At block 636, the UE 115-c may identify a LBT scheme for initiating the uplink transmission based at least in part on information received in the uplink grant. At block 638, UE 115-c may perform the identified LBT scheme to initiate the uplink transmission(s) 644 based at least in part on the time difference.

Figure 7:
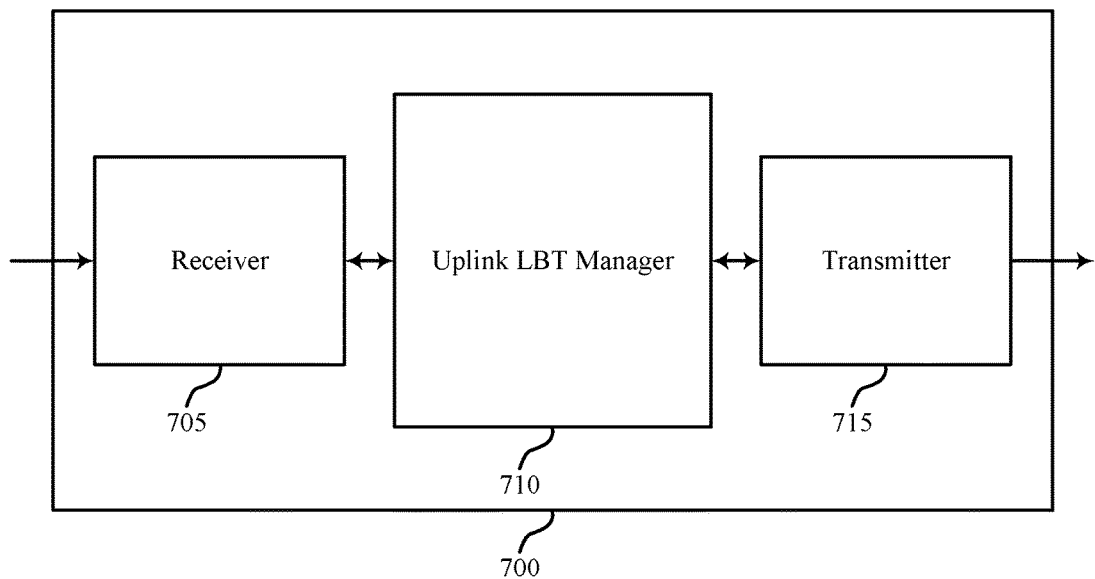
FIGS. 7 through 9 show block diagrams of a wireless device that supports LBT for uplink transmissions in accordance with aspects of the present disclosure.

FIG. 7 shows a block diagram of a wireless device 700 that supports multiple LBT techniques for uplink transmissions in accordance with various aspects of the present disclosure. Wireless device 700 may be an example of aspects of a UE 115 described with reference to FIGS. 1, 2, and 6. Wireless device 700 may include receiver 705, uplink LBT manager 710 and transmitter 715. Wireless device 700 may also include a processor. Each of these components may be in communication with each other.

The receiver 705 may receive information such as packets, user data, or control information associated with various information channels (e.g., control channels, data channels, and information related to LBT for uplink transmissions, etc.). Information may be passed on to other components of the device. The receiver 705 may be an example of aspects of the transceiver 1025 described with reference to FIG. 10.

The uplink LBT manager 710 may receive an uplink grant. For example, the uplink grant may be received from a base station, and may identify uplink resources for an uplink transmission. The uplink grant may also explicitly indicate an LBT scheme for the UE to perform (e.g., a shortened LBT procedure or a full LBT procedure). The uplink LBT manager 710 may select a LBT scheme for initiating the uplink transmission based on a time difference between receiving the uplink grant and the uplink resources for the uplink transmission. The uplink LBT manager 710 may also be an example of aspects of the uplink LBT manager 1005 described with reference to FIG. 10.

The transmitter 715 may transmit signals received from other components of wireless device 700. In some examples, the transmitter 715 may be collocated with a receiver in a transceiver module. For example, the transmitter 715 may be an example of aspects of the transceiver 1025 described with reference to FIG. 10. The transmitter 715 may include a single antenna, or it may include a plurality of antennas.

Figure 8:
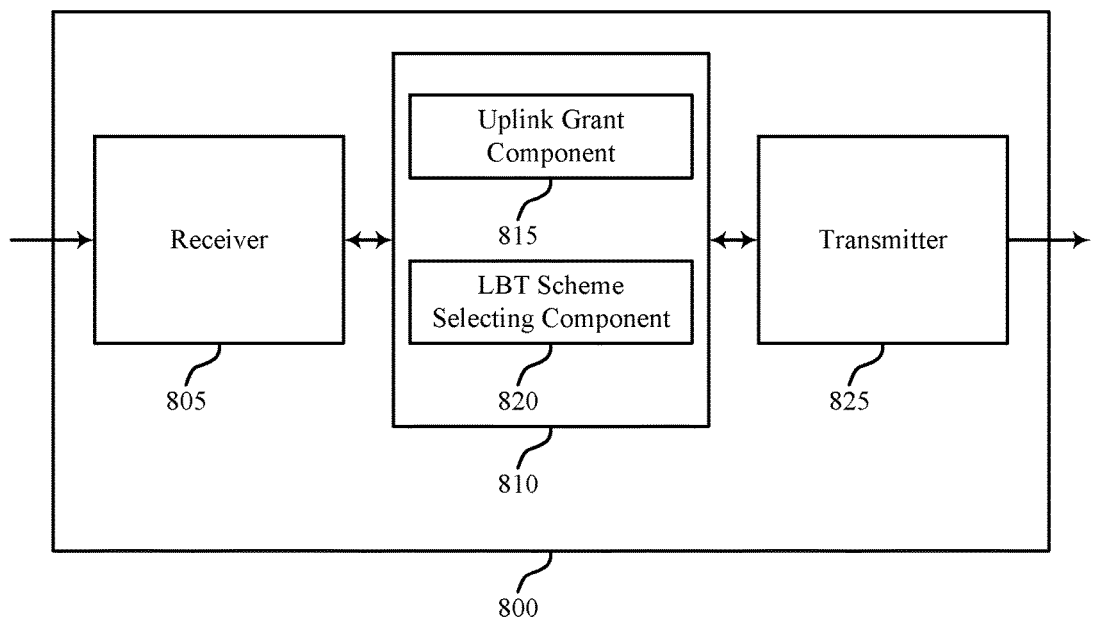

FIG. 8 shows a block diagram of a wireless device 800 that supports LBT for uplink transmissions in accordance with various aspects of the present disclosure. Wireless device 800 may be an example of aspects of a wireless device 700 or a UE 115 described with reference to FIGS. 1, 2, 6, and 7. Wireless device 800 may include receiver 805, uplink LBT manager 810 and transmitter 825. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10.

The uplink LBT manager 810 may be an example of aspects of uplink LBT manager 710 described with reference to FIG. 7. The uplink LBT manager 810 may include uplink grant component 815 and LBT scheme selecting component 820. The uplink LBT manager 810 may be an example of aspects of the uplink LBT manager 1005 described with reference to FIG. 10.

The uplink grant component 815 may receive an uplink grant identifying uplink resources for an uplink transmission. In some cases, the receiving the uplink grant comprises: receiving uplink resources for uplink transmissions in two or more uplink subframes, and the LBT scheme may be selected for initiating each uplink transmission for each of the two or more uplink subframes based on associated time differences between receiving the uplink grant and the uplink resources associated with each uplink subframe. In some cases, the uplink resources for the two or more uplink subframes are indicated in the uplink grant or linked to a previous grant of uplink resources.

The LBT scheme selecting component 820 may select a second LBT scheme when the time difference exceeds the threshold time value, or select a second LBT scheme when it is determined that the base station has not successfully performed a LBT for a subsequent TxOP, according to some examples. In some examples, the first LBT scheme may be an abbreviated or shortened LBT scheme relative to the second LBT scheme. In some cases, the selecting the LBT scheme may include selecting a first LBT scheme when the time difference is at or below a threshold time value. In some cases, the threshold time value corresponds to a remaining time within a current transmission opportunity (TxOP). In some cases, the threshold time value corresponds to a remaining time within a current LBT frame. In some cases, the selecting the LBT scheme may include selecting a first, or shortened, LBT scheme when it is determined that the base station has successfully performed a LBT for the subsequent TxOP.

The transmitter 825 may transmit signals received from other components of wireless device 800. In some examples, the transmitter 825 may be collocated with a receiver in a transceiver module. For example, the transmitter 825 may be an example of aspects of the transceiver 1025 described with reference to FIG. 10. The transmitter 825 may utilize a single antenna, or it may utilize a plurality of antennas.

Figure 9:
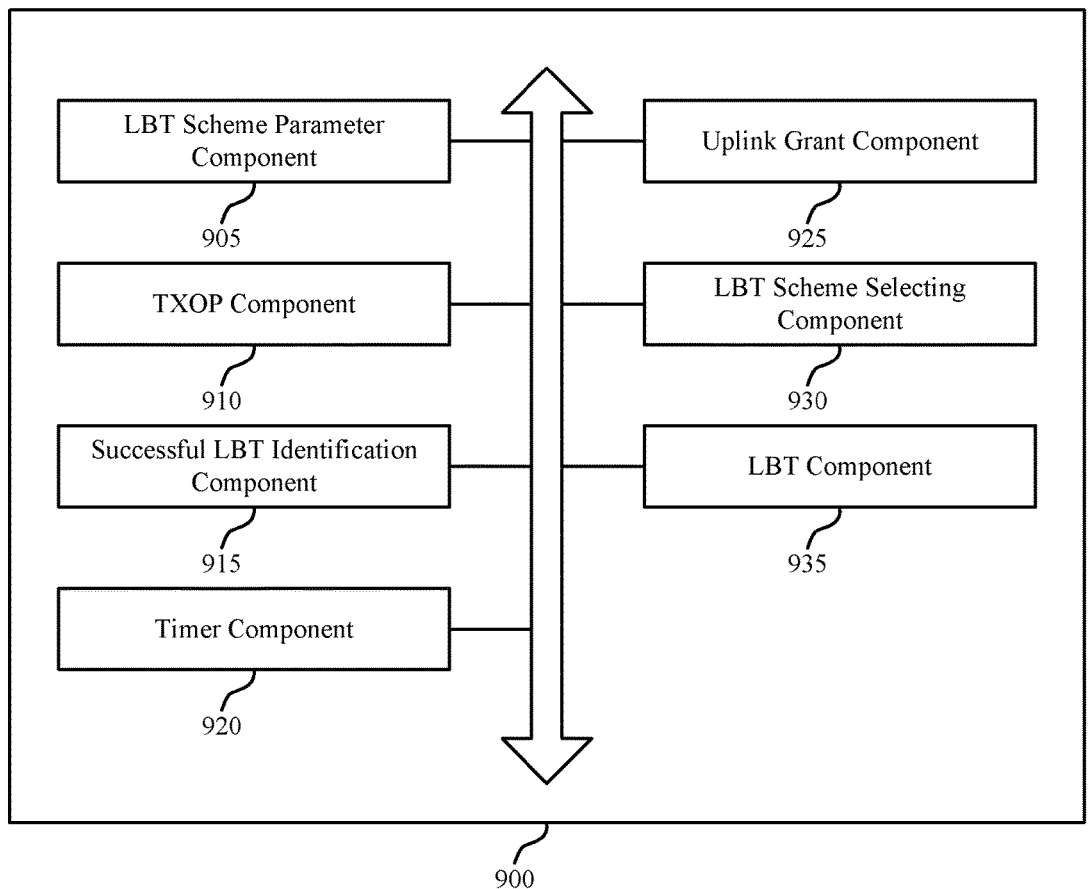

FIG. 9 shows a block diagram of a uplink LBT manager 900 which may be an example of the corresponding component of wireless device 700 or wireless device 800. That is, uplink LBT manager 900 may be an example of aspects of uplink LBT manager 710 or uplink LBT manager 810 described with reference to FIGS. 7 and 8. The uplink LBT manager 900 may also be an example of aspects of the uplink LBT manager 1005 described with reference to FIG. 10.

The uplink LBT manager 900 may include LBT scheme parameter component 905, TXOP component 910, successful LBT identification component 915, timer component 920, uplink grant component 925, LBT scheme selecting component 930, and LBT component 935. Each of these modules may communicate, directly or indirectly, with one another (e.g., via one or more buses).

The LBT scheme parameter component 905 may receive one or more parameters for selecting the LBT scheme for initiating the uplink transmission. Selecting the LBT scheme may be based on the one or more parameters. In some cases, the one or more parameters may include one or more of a threshold time value, a channel reservation duration value, or a LBT frame duration value. In some cases, the one or more parameters may be received in one or more of a common downlink control channel transmission, the uplink grant, or RRC signaling. The TXOP component 910 may determine that the uplink resources for the uplink transmission are in a subsequent transmission opportunity (TxOP) outside of a current TxOP.

The successful LBT identification component 915 may determine whether a base station transmitting the uplink grant has successfully performed a LBT for the subsequent TxOP, and the LBT scheme may be selected based at least in part on whether the base station has successfully performed a LBT for the subsequent TxOP. The successful LBT identification component 915 may, for example, monitor for a CRS transmitted by the base station in the subsequent TxOP.

The timer component 920 may initiate a timer after receiving the uplink grant, and the selecting the LBT scheme may be based at least in part on the timer. In some cases, an energy detection threshold or a contention window (CW) size is determined based on the timer. In some cases, the energy detection threshold or CW size are selected as a function of a value of the timer when initiating the LBT scheme.

The uplink grant component 925 may receive an uplink grant identifying uplink resources for an uplink transmission. The LBT scheme selecting component 930 may select a second LBT scheme when the time difference exceeds the threshold time value, select a second LBT scheme when it is determined that the base station has not successfully performed a LBT for the subsequent TxOP, or select a LBT scheme for initiating the uplink transmission based on a time difference between receiving the uplink grant and the uplink resources for the uplink transmission. The LBT component 935 may perform the selected LBT scheme to initiate the uplink transmission.

The LBT parameters for subsequent downlink transmissions may, in some implementations, depend on whether a successful uplink acknowledgement is received or not. This may include ACK (successful decoding at UE) or a NACK (UE unsuccessful at decoding) or a DTX (uplink channel is not received at eNB). In the case of uplink transmissions being contention-based and subject to LBT procedures, the UE may fail contention and not transmit the acknowledgement channel at all. In such cases, the base station may choose to ignore DTX when adjusting one or more LBT parameters, such as contention window adaptation. In examples where the uplink channel is contention-exempt, then the base station may use uplink acknowledgments when adjusting one or more LBT parameters, such as contention window adaptation.

Additionally, the base station may use the uplink acknowledgements received on multiple subframes, such as a set of reference subframes, as one or more instances of uplink acknowledgement transmissions, to determine the conditions for adjusting one or more LBT parameters, such as contention window adaptation.

Figure 10:
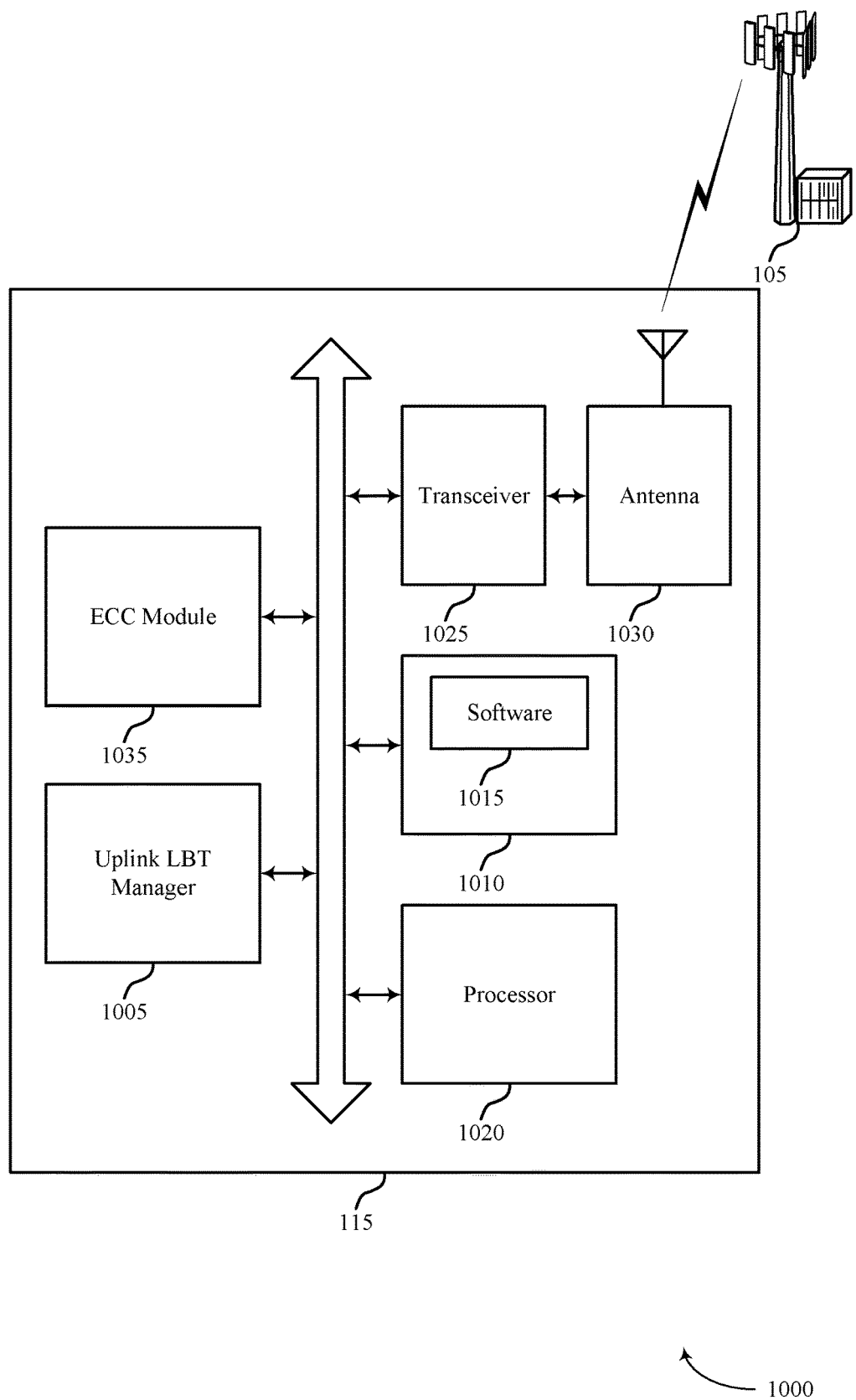
FIG. 10 illustrates a block diagram of a system including a UE that supports LBT for uplink transmissions in accordance with aspects of the present disclosure.

FIG. 10 shows a diagram of a system 1000 including a device that supports LBT for uplink transmissions in accordance with various aspects of the present disclosure. For example, system 1000 may include UE 115, which may be an example of a wireless device 700, a wireless device 800, or a UE 115 as described with reference to FIGS. 1, 2, and 6 through 9.

UE 115 may also include uplink LBT manager 1005, memory 1010, processor 1020, transceiver 1025, antenna 1030 and ECC module 1035. Each of these modules may communicate, directly or indirectly, with one another (e.g., via one or more buses). The uplink LBT manager 1005 may be an example of a uplink LBT manager as described with reference to FIGS. 7 through 9.

The memory 1010 may include random access memory (RAM) and read only memory (ROM). The memory 1010 may store computer-readable, computer-executable software including instructions that, when executed, cause the processor to perform various functions described herein (e.g., LBT for uplink transmissions, etc.). In some cases, the software 1015 may not be directly executable by the processor but may cause a computer (e.g., when compiled and executed) to perform functions described herein. The processor 1020 may include an intelligent hardware device, (e.g., a central processing unit (CPU), a microcontroller, an application specific integrated circuit (ASIC), etc.)

The transceiver 1025 may communicate bi-directionally, via one or more antennas, wired, or wireless links, with one or more networks, as described above. For example, the transceiver 1025 may communicate bi-directionally with a base station 105 or a UE 115. The transceiver 1025 may also include a modem to modulate the packets and provide the modulated packets to the antennas for transmission, and to demodulate packets received from the antennas. In some cases, the wireless device may include a single antenna 1030. However, in some cases the device may have more than one antenna 1030, which may be capable of concurrently transmitting or receiving multiple wireless transmissions. The ECC module 1035 may enable operations using eCCs such as communication using shared or unlicensed spectrum, using reduced TTIs or subframe durations, or using a large number of CCs.

Figure 11:
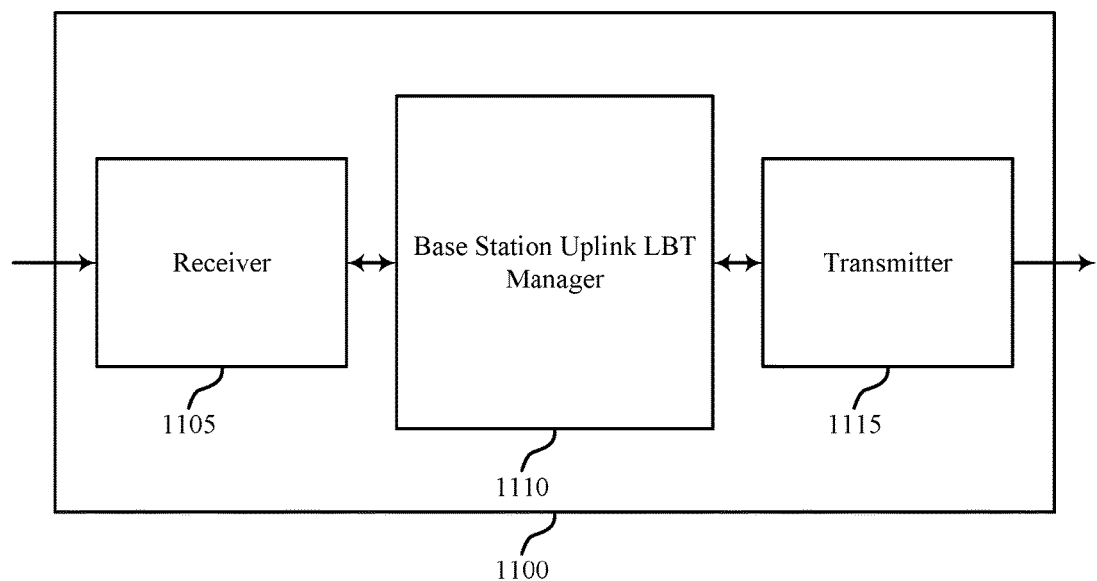
FIGS. 11 through 13 show block diagrams of a wireless device that supports LBT for uplink transmissions in accordance with aspects of the present disclosure.

FIG. 11 shows a block diagram of a wireless device 1100 that supports LBT for uplink transmissions in accordance with various aspects of the present disclosure. Wireless device 1100 may be an example of aspects of a base station 105 described with reference to FIGS. 1, 2, and 6. Wireless device 1100 may include receiver 1105, base station uplink LBT manager 1110 and transmitter 1115. Wireless device 1100 may also include a processor. Each of these components may be in communication with each other.

The receiver 1105 may receive information such as packets, user data, or control information associated with various information channels (e.g., control channels, data channels, and information related to LBT for uplink transmissions, etc.). Information may be passed on to other components of the device. The receiver 1105 may be an example of aspects of the transceiver 1425 described with reference to FIG. 14.

The base station uplink LBT manager 1110 may identify one or more timing parameters for use by a UE to select a LBT scheme for initiating an uplink transmission, and may transmit, to the UE, an uplink grant identifying uplink resources for the uplink transmission. The base station uplink LBT manager 1110 may also be an example of aspects of the base station uplink LBT manager 1405 described with reference to FIG. 14.

The transmitter 1115 may transmit signals received from other components of wireless device 1100. In some examples, the transmitter 1115 may be collocated with a receiver in a transceiver module. For example, the transmitter 1115 may be an example of aspects of the transceiver 1425 described with reference to FIG. 14. The transmitter 1115 may include a single antenna, or it may include a plurality of antennas.

Figure 12:
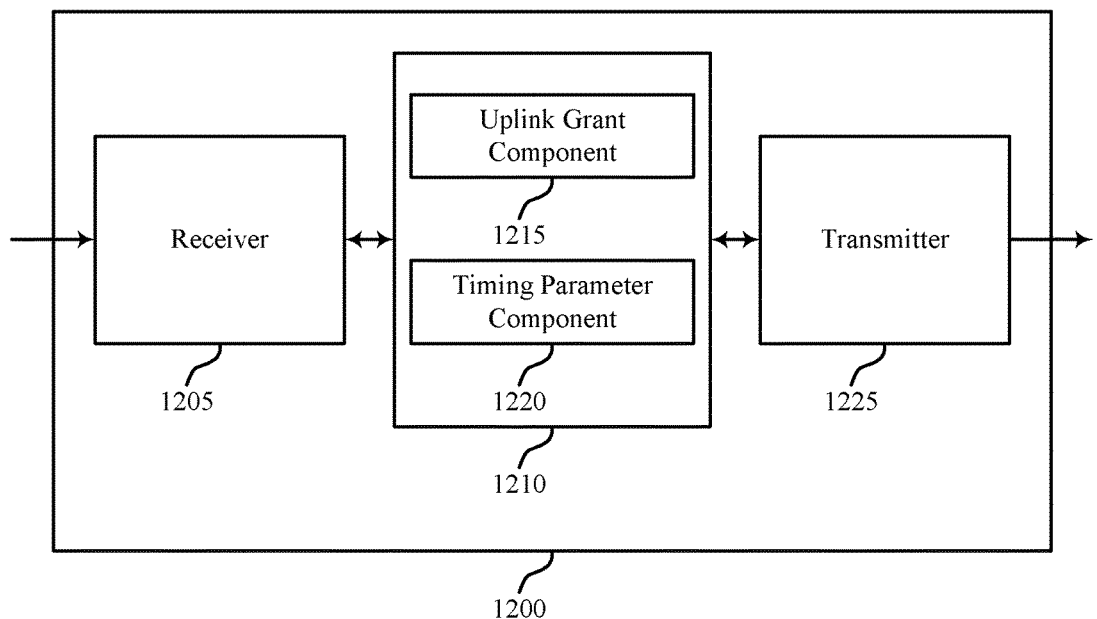

FIG. 12 shows a block diagram of a wireless device 1200 that supports LBT for uplink transmissions in accordance with various aspects of the present disclosure. Wireless device 1200 may be an example of aspects of a wireless device 1100 or a base station 105 described with reference to FIGS. 1, 2, 6, and 11. Wireless device 1200 may include receiver 1205, base station uplink LBT manager 1210 and transmitter 1225. Wireless device 1200 may also include a processor. Each of these components may be in communication with each other.

The receiver 1205 may receive information which may be passed on to other components of the device. The receiver 1205 may also perform the functions described with reference to the receiver 1105 of FIG. 11. The receiver 1205 may be an example of aspects of the transceiver 1425 described with reference to FIG. 14.

The base station uplink LBT manager 1210 may be an example of aspects of base station uplink LBT manager 1110 described with reference to FIG. 11. The base station uplink LBT manager 1210 may include uplink grant component 1215 and timing parameter component 1220. The base station uplink LBT manager 1210 may be an example of aspects of the base station uplink LBT manager 1405 described with reference to FIG. 14.

The uplink grant component 1215 may transmit, to the UE, an uplink grant identifying uplink resources for the uplink transmission. The uplink grant may also explicitly indicate an LBT scheme for the UE to perform. In some cases, the transmitting the uplink grant may include transmitting uplink resources for uplink transmissions in two or more uplink subframes, and transmitting an indication of the LBT scheme for use in initiating each uplink transmission for each of the two or more uplink subframes that is based on associated time differences between receiving the uplink grant and the uplink resources associated with each uplink subframe.

The timing parameter component 1220 may identify one or more timing parameters for use by a UE to select a LBT scheme for initiating an uplink transmission, and transmit the one or more timing parameters to the UE. Such transmissions may be made, for example, using one or more of a common DL control channel transmission, the uplink grant, or RRC signaling. In some cases, the one or more timing parameters comprise one or more of a threshold time value between receipt of the uplink grant and the uplink resources or an indication of the LBT scheme to be selected based on the threshold time value. In some cases, the indication of the LBT scheme may include a first indication that a first LBT scheme is to be used when a time difference between receipt of the uplink grant and the uplink resources is at or below the threshold time value and a second indication that a second LBT scheme is to be used when the time difference between receipt of the uplink grant and the uplink resources exceeds the threshold time value. In some cases, the first LBT scheme comprises an abbreviated or shortened LBT scheme relative to the second LBT scheme. In some cases, the threshold time value corresponds to a remaining time within a current transmission opportunity (TxOP). In some cases, the threshold time value corresponds to a remaining time within a current LBT frame. In some cases, the one or more timing parameters comprise one or more of a threshold time value, a channel reservation duration value, or a LBT frame duration value.

The transmitter 1225 may transmit signals received from other components of wireless device 1200. In some examples, the transmitter 1225 may be collocated with a receiver in a transceiver module. For example, the transmitter 1225 may be an example of aspects of the transceiver 1425 described with reference to FIG. 14. The transmitter 1225 may utilize a single antenna, or it may utilize a plurality of antennas.

Figure 13:
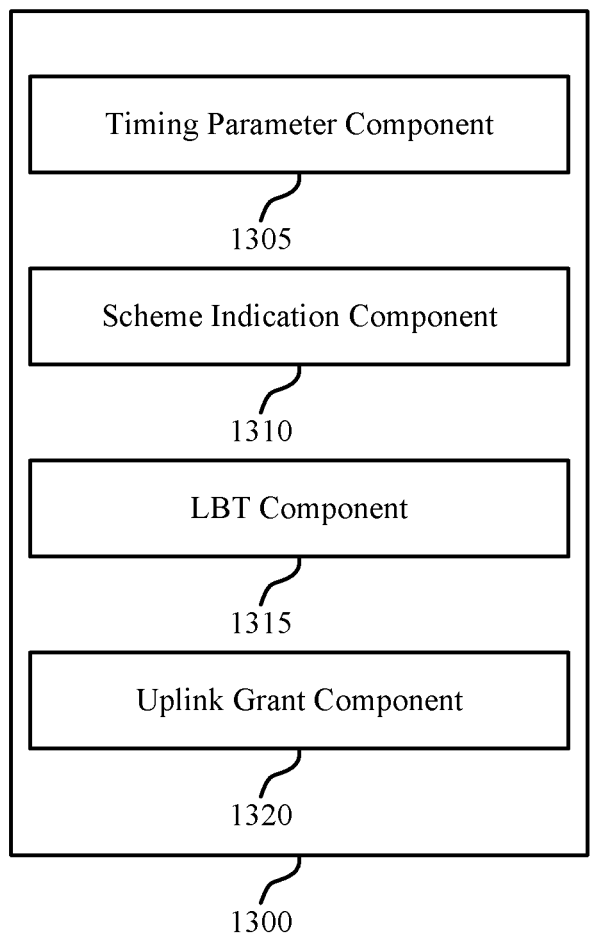

FIG. 13 shows a block diagram of a base station uplink LBT manager 1300 which may be an example of the corresponding component of wireless device 1100 or wireless device 1200. That is, base station uplink LBT manager 1300 may be an example of aspects of base station uplink LBT manager 1110 or base station uplink LBT manager 1210 described with reference to FIGS. 11 and 12. The base station uplink LBT manager 1300 may also be an example of aspects of the base station uplink LBT manager 1405 described with reference to FIG. 14.

The base station uplink LBT manager 1300 may include timing parameter component 1305, scheme indication component 1310, LBT component 1315 and uplink grant component 1320. Each of these modules may communicate, directly or indirectly, with one another (e.g., via one or more buses).

The timing parameter component 1305 may identify one or more timing parameters for use by a UE to select a LBT scheme for initiating an uplink transmission, and transmit the one or more timing parameters to the UE using one or more of a common DL control channel transmission, the uplink grant, or RRC signaling.

The scheme indication component 1310 may, when the uplink resources for the uplink transmission are in a subsequent TxOP outside of a current TxOP, transmit an indication to use a first LBT scheme when a LBT procedure is successfully performed for the subsequent TxOP and to use a second LBT scheme when the LBT procedure is not successfully performed for the subsequent TxOP. The first LBT scheme may be an abbreviated LBT scheme relative to the second LBT scheme. In some cases, the indication further comprises one or more of an energy detection threshold or a contention window (CW) size that are to be determined based on a time between a DL transmission that includes the uplink grant and the uplink resources of the subsequent TxOP.

The LBT component 1315 may perform a LBT procedure to reserve a wireless communications channel for both a DL transmission to the UE and the uplink transmission. The uplink grant component 1320 may transmit, to the UE, an uplink grant identifying uplink resources for the uplink transmission.

Figure 14:
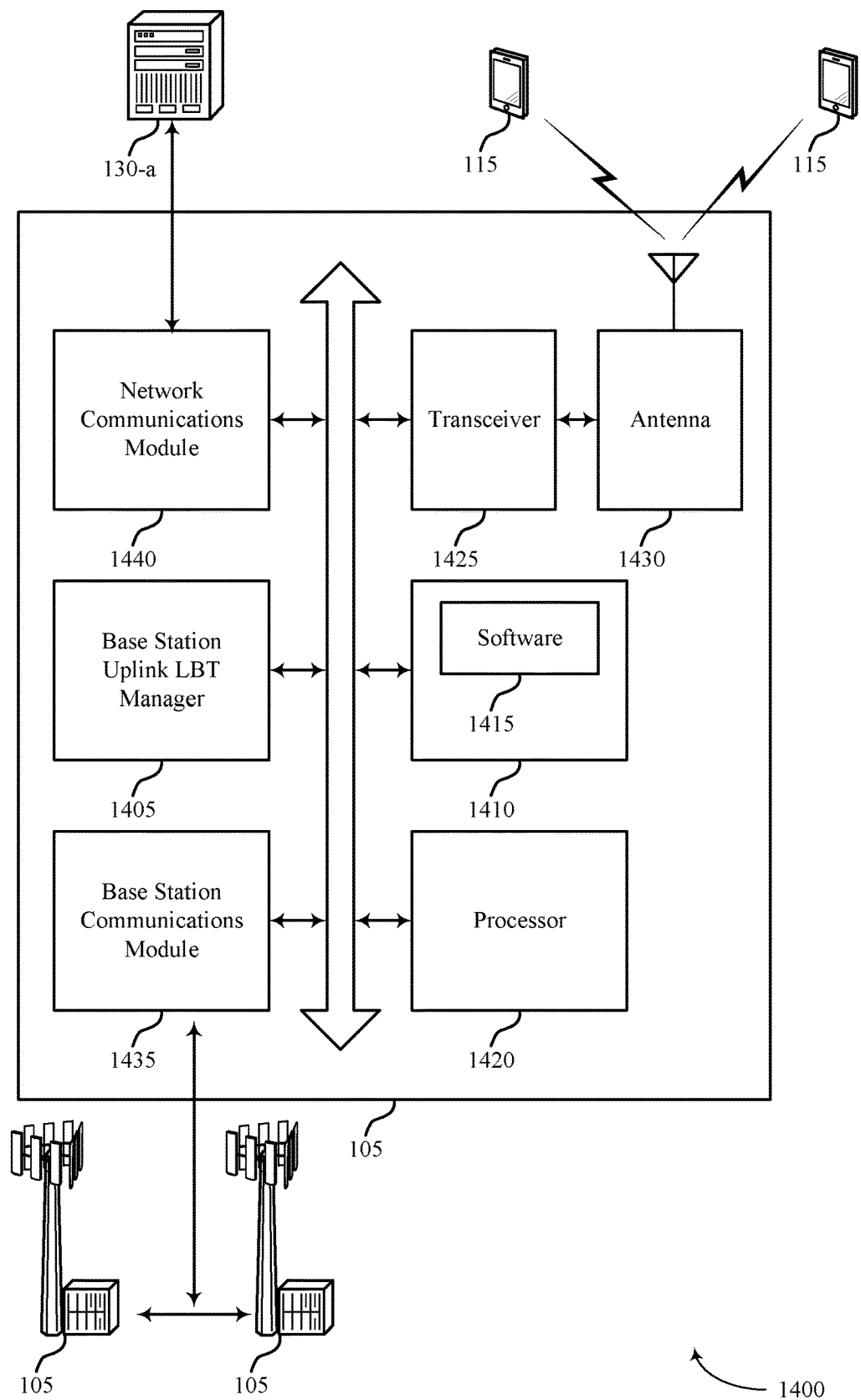
FIG. 14 illustrates a block diagram of a system including a base station that supports LBT for uplink transmissions in accordance with aspects of the present disclosure.

FIG. 14 shows a diagram of a wireless system 1400 including a device that supports LBT for uplink transmissions in accordance with various aspects of the present disclosure. For example, system 1400 may include base station 105, which may be an example of a wireless device 1100, a wireless device 1200, or a base station 105 as described with reference to FIGS. 1, 2, 6, and 11 through 13. Base station 105 may also include components for bi-directional voice and data communications including components for transmitting communications and components for receiving communications. For example, base station 105 may communicate bi-directionally with one or more UEs 115.

Base station 105 may also include base station uplink LBT manager 1405, memory 1410, processor 1420, transceiver 1425, antenna 1430, base station communications module 1435 and network communications module 1440. Each of these modules may communicate, directly or indirectly, with one another (e.g., via one or more buses). The base station uplink LBT manager 1405 may be an example of a base station uplink LBT manager as described with reference to FIGS. 11 through 13.

The memory 1410 may include RAM and ROM. The memory 1410 may store computer-readable, computer-executable software including instructions that, when executed, cause the processor to perform various functions described herein (e.g., LBT for uplink transmissions, etc.). In some cases, the software 1415 may not be directly executable by the processor but may cause a computer (e.g., when compiled and executed) to perform functions described herein. The processor 1420 may include an intelligent hardware device, (e.g., a CPU, a microcontroller, an ASIC, etc.)

The transceiver 1425 may communicate bi-directionally, via one or more antennas, wired, or wireless links, with one or more networks, as described above. For example, the transceiver 1425 may communicate bi-directionally with a base station 105 or a UE 115. The transceiver 1425 may also include a modem to modulate the packets and provide the modulated packets to the antennas for transmission, and to demodulate packets received from the antennas. In some cases, the wireless device may include a single antenna 1430. However, in some cases the device may have more than one antenna 1030, which may be capable of concurrently transmitting or receiving multiple wireless transmissions.

The base station communications module 1435 may manage communications with other base station 105, and may include a controller or scheduler for controlling communications with UEs 115 in cooperation with other base stations 105. For example, the base station communications module 1435 may coordinate scheduling for transmissions to UEs 115 for various interference mitigation techniques such as beamforming or joint transmission. In some examples, base station communications module 1435 may provide an X2 interface within an LTE/LTE-A wireless communication network technology to provide communication between base stations 105.

The network communications module 1440 may manage communications with the core network (e.g., via one or more wired backhaul links). For example, the network communications module 1440 may manage the transfer of data communications for client devices, such as one or more UEs 115.

Figure 15:
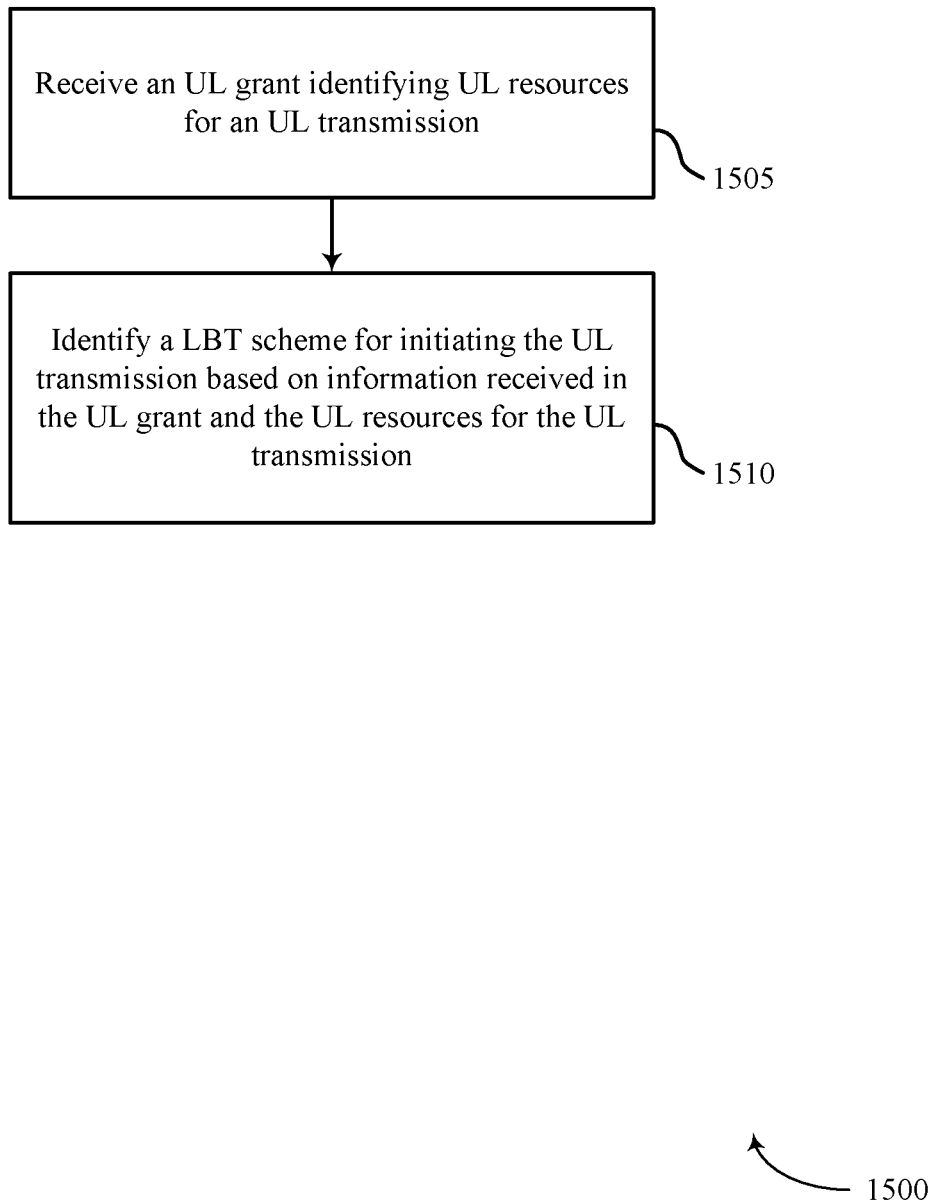
FIGS. 15 through 20 illustrate methods for LBT for uplink transmissions in accordance with aspects of the present disclosure.

FIG. 15 shows a flowchart illustrating a method 1500 for LBT for uplink transmissions in accordance with various aspects of the present disclosure. The operations of method 1500 may be implemented by a device such as a UE 115 or its components as described with reference to FIGS. 1, 2, and 6-10. For example, the operations of method 1500 may be performed by the uplink LBT manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive an uplink grant identifying uplink resources for an uplink transmission as described above with reference to FIGS. 2 through 6. In certain examples, the operations of block 1505 may be performed by the uplink grant component as described with reference to FIGS. 8 and 9.

At block 1510, the UE 115 may select a LBT scheme for initiating the uplink transmission based on information received in the uplink resources for the uplink transmission as described above with reference to FIGS. 2 through 6. In certain examples, the operations of block 1510 may be performed by the LBT scheme selecting component as described with reference to FIGS. 8 and 9.

Figure 16:
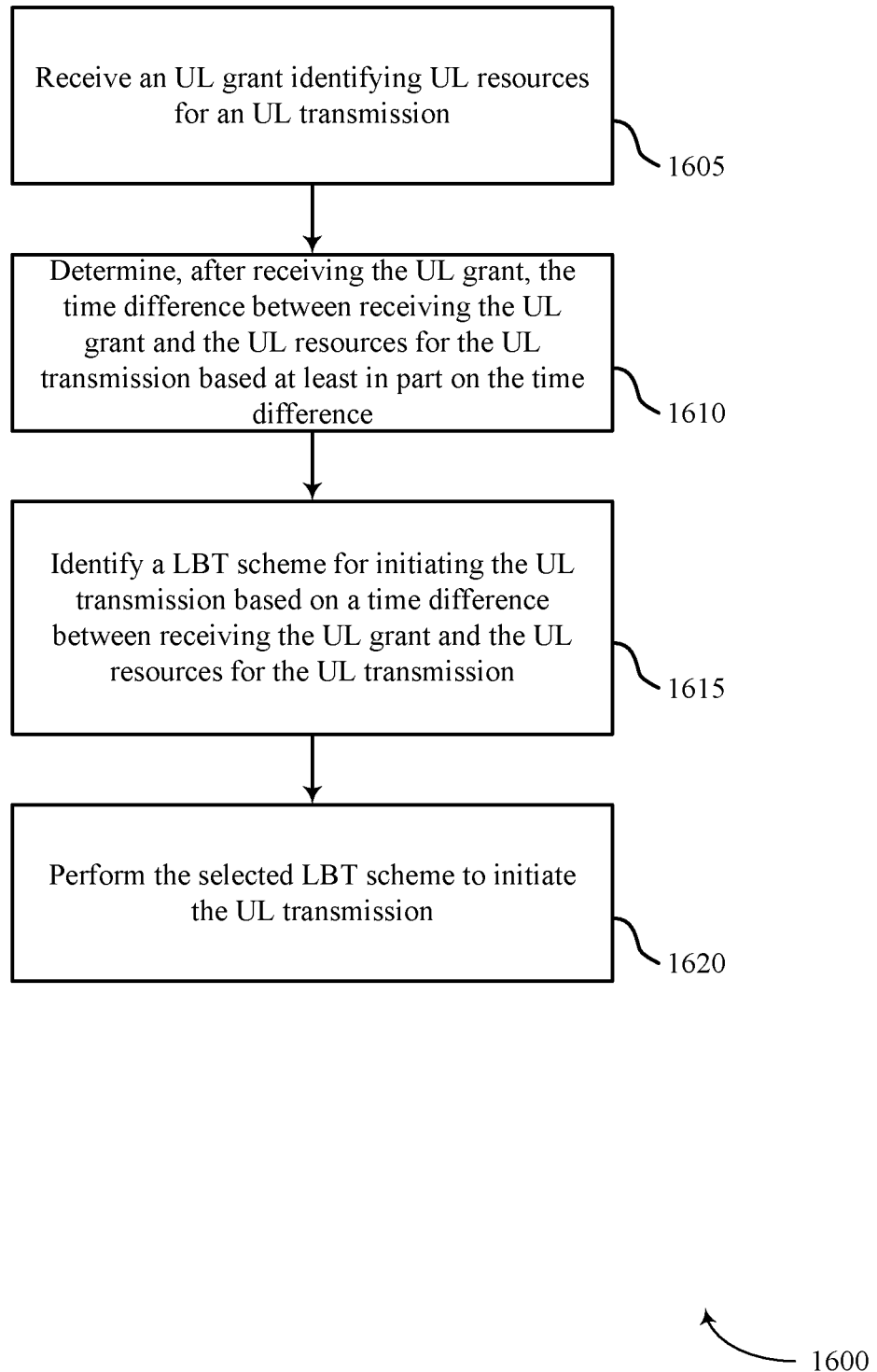

FIG. 16 shows a flowchart illustrating a method 1600 for LBT for uplink transmissions in accordance with various aspects of the present disclosure. The operations of method 1600 may be implemented by a device such as a UE 115 or its components as described with reference to FIGS. 1, 2, and 6-10. For example, the operations of method 1600 may be performed by the uplink LBT manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive an uplink grant identifying uplink resources for an uplink transmission as described above with reference to FIGS. 2 through 6. In certain examples, the operations of block 1605 may be performed by the uplink grant component as described with reference to FIGS. 8 and 9.

At block 1610, the UE 115 may determine, after receiving the uplink grant, the time difference between receiving the uplink grant and the uplink resources for the uplink transmission as described above with reference to FIGS. 2 through 6. In certain examples, the operations of block 1610 may be performed by the time difference component as described with reference to FIGS. 8 and 9.

At block 1615, the UE 115 may select a LBT scheme for initiating the uplink transmission based on a time difference between receiving the uplink grant and the uplink resources for the uplink transmission as described above with reference to FIGS. 2 through 6. In certain examples, the operations of block 1615 may be performed by the LBT scheme selecting component as described with reference to FIGS. 8 and 9.

At block 1620, the UE 115 may perform the selected LBT scheme to initiate the uplink transmission as described above with reference to FIGS. 2 through 6. In certain examples, the operations of block 1620 may be performed by the LBT component as described with reference to FIGS. 8 and 9.

Figure 17:
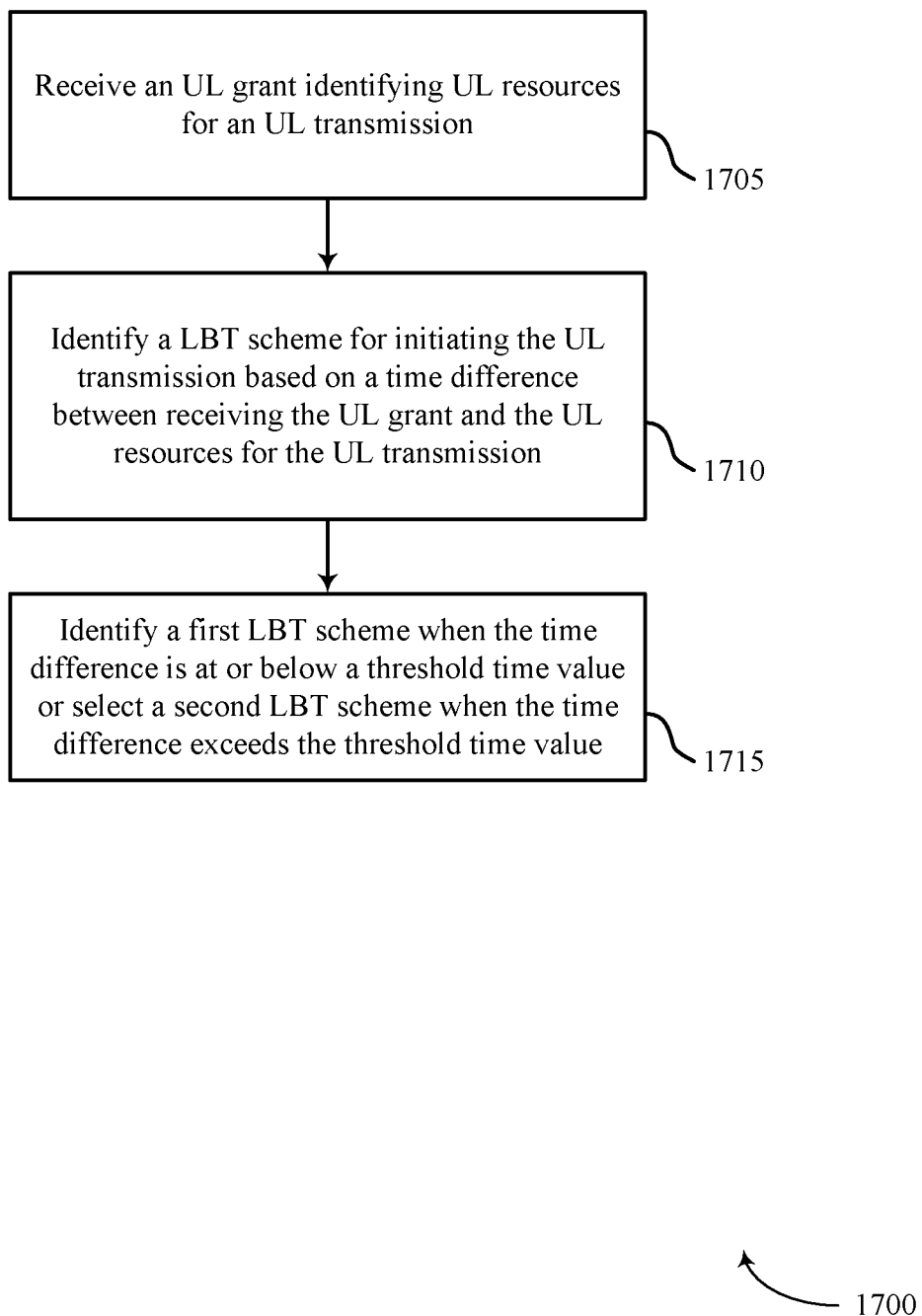

FIG. 17 shows a flowchart illustrating a method 1700 for LBT for uplink transmissions in accordance with various aspects of the present disclosure. The operations of method 1700 may be implemented by a device such as a UE 115 or its components as described with reference to FIGS. 1, 2, and 6-10. For example, the operations of method 1700 may be performed by the uplink LBT manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may receive an uplink grant identifying uplink resources for an uplink transmission as described above with reference to FIGS. 2 through 6. In certain examples, the operations of block 1705 may be performed by the uplink grant component as described with reference to FIGS. 8 and 9.

At block 1710, the UE 115 may identify a LBT scheme for initiating the uplink transmission based on a time difference between receiving the uplink grant and the uplink resources for the uplink transmission as described above with reference to FIGS. 2 through 6. In certain examples, the operations of block 1710 may be performed by the LBT scheme selecting component as described with reference to FIGS. 8 and 9.

At block 1715, the UE 115 may identify a first LBT scheme when the time difference is at or below a threshold time value or select a second LBT scheme when the time difference exceeds the threshold time value as described above with reference to FIGS. 2 through 6. In certain examples, the operations of block 1715 may be performed by the LBT scheme selecting component as described with reference to FIGS. 8 and 9.

Figure 18:
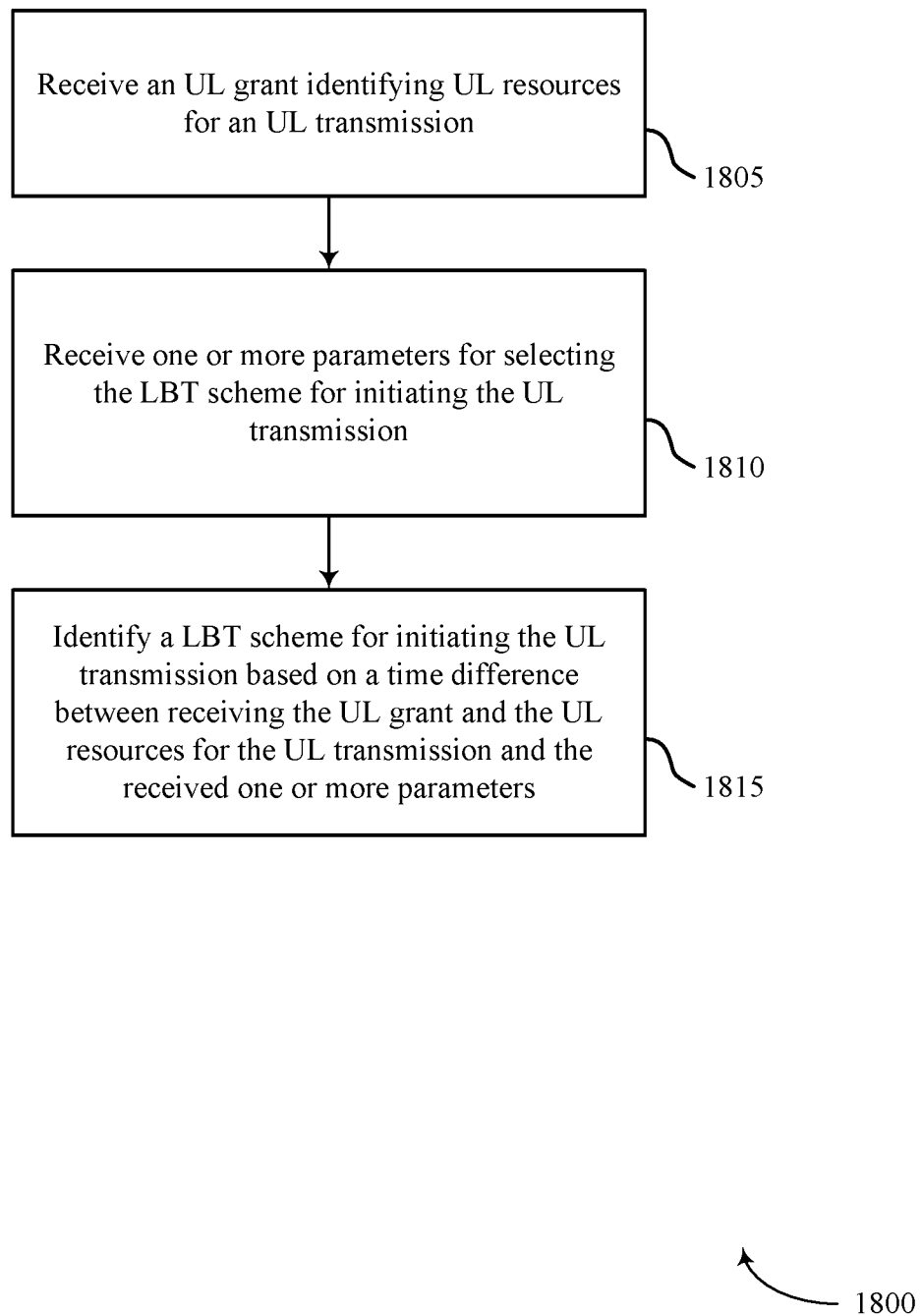

FIG. 18 shows a flowchart illustrating a method 1800 for LBT for uplink transmissions in accordance with various aspects of the present disclosure. The operations of method 1800 may be implemented by a device such as a UE 115 or its components as described with reference to FIGS. 1, 2, and 6-10. For example, the operations of method 1800 may be performed by the uplink LBT manager as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may receive an uplink grant identifying uplink resources for an uplink transmission as described above with reference to FIGS. 2 through 6. In certain examples, the operations of block 1805 may be performed by the uplink grant component as described with reference to FIGS. 8 and 9.

At block 1810, the UE 115 may receive one or more parameters for selecting the LBT scheme for initiating the uplink transmission, wherein the selecting the LBT scheme is further based on the one or more parameters as described above with reference to FIGS. 2 through 6. In certain examples, the operations of block 1810 may be performed by the LBT scheme parameter component as described with reference to FIGS. 8 and 9.

At block 1815, the UE 115 may identify a LBT scheme for initiating the uplink transmission based on a time difference between receiving the uplink grant and the uplink resources for the uplink transmission and the received one or more parameters as described above with reference to FIGS. 2 through 6. In certain examples, the operations of block 1815 may be performed by the LBT scheme selecting component as described with reference to FIGS. 8 and 9.

Figure 19:
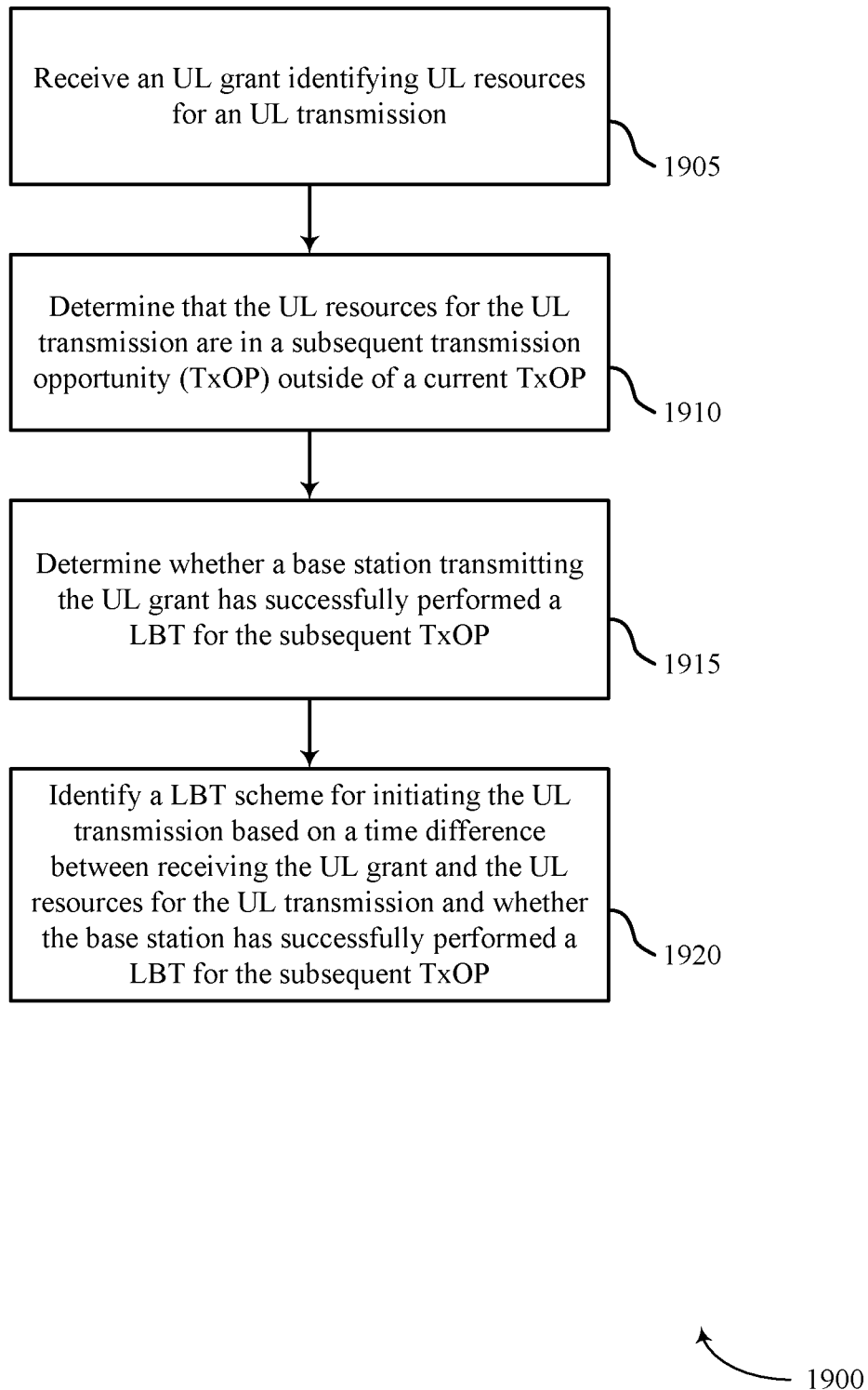

FIG. 19 shows a flowchart illustrating a method 1900 for LBT for uplink transmissions in accordance with various aspects of the present disclosure. The operations of method 1900 may be implemented by a device such as a UE 115 or its components as described with reference to FIGS. 1, 2, and 6-10. For example, the operations of method 1900 may be performed by the uplink LBT manager as described herein. In some examples, the UE 115 may execute a set of codes to control the functional elements of the device to perform the functions described below. Additionally or alternatively, the UE 115 may perform aspects the functions described below using special-purpose hardware.

At block 1905, the UE 115 may receive an uplink grant identifying uplink resources for an uplink transmission as described above with reference to FIGS. 2 through 6. In certain examples, the operations of block 1905 may be performed by the uplink grant component as described with reference to FIGS. 8 and 9.

At block 1910, the UE 115 may determine that the uplink resources for the uplink transmission are in a subsequent transmission opportunity (TxOP) outside of a current TxOP as described above with reference to FIGS. 2 through 6. In certain examples, the operations of block 1910 may be performed by the TXOP component as described with reference to FIGS. 8 and 9.

At block 1915, the UE 115 may determine whether a base station transmitting the uplink grant has successfully performed a LBT for the subsequent TxOP, wherein the selecting the LBT scheme is further based at least in part on whether the base station has successfully performed a LBT for the subsequent TxOP as described above with reference to FIGS. 2 through 6. In certain examples, the operations of block 1915 may be performed by the successful LBT identification component as described with reference to FIGS. 8 and 9.

At block 1920, the UE 115 may identify a LBT scheme for initiating the uplink transmission based on a time difference between receiving the uplink grant and the uplink resources for the uplink transmission and whether the base station has successfully performed a LBT for the subsequent TxOP as described above with reference to FIGS. 2 through 6. In certain examples, the operations of block 1920 may be performed by the LBT scheme selecting component as described with reference to FIGS. 8 and 9.

Figure 20:
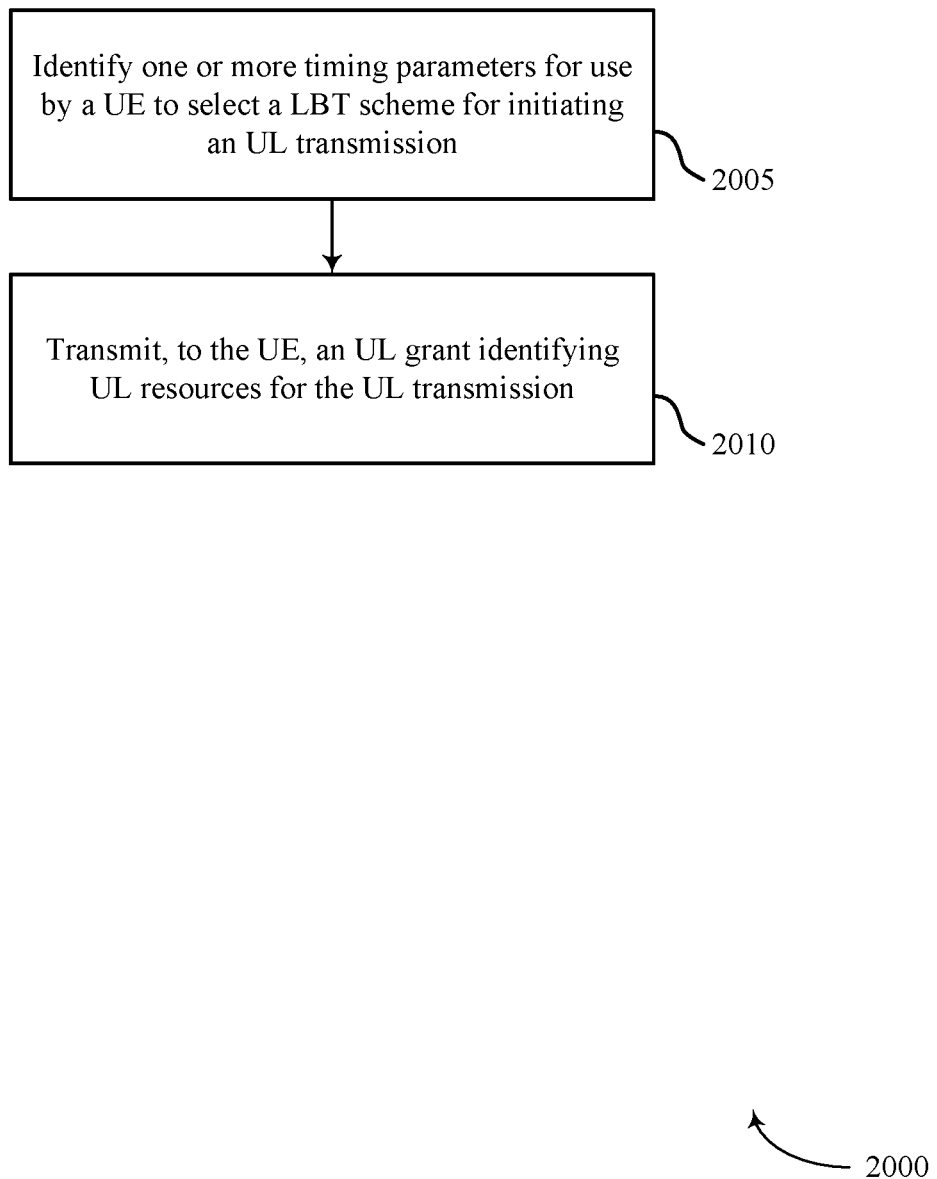

FIG. 20 shows a flowchart illustrating a method 2000 for LBT for uplink transmissions in accordance with various aspects of the present disclosure. The operations of method 2000 may be implemented by a device such as a base station 105 or its components as described with reference to FIGS. 1, 2, 6, and 11-14. For example, the operations of method 2000 may be performed by the base station uplink LBT manager as described herein. In some examples, the base station 105 may execute a set of codes to control the functional elements of the device to perform the functions described below. Additionally or alternatively, the base station 105 may perform aspects the functions described below using special-purpose hardware.

At block 2005, the base station 105 may identify one or more timing parameters for use by a UE to select a LBT scheme for initiating an uplink transmission as described above with reference to FIGS. 2 through 6. In certain examples, the operations of block 2005 may be performed by the timing parameter component as described with reference to FIGS. 12 and 13.

At block 2010, the base station 105 may transmit, to the UE, an uplink grant identifying uplink resources for the uplink transmission as described above with reference to FIGS. 2 through 6. In certain examples, the operations of block 2010 may be performed by the uplink grant component as described with reference to FIGS. 12 and 13.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for LBT for uplink transmissions.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C). Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for LBT for uplink transmissions. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communication, comprising:
    receiving an uplink grant identifying uplink resources for an uplink transmission;

identifying, after receiving the uplink grant, a time difference between receiving the uplink grant and the uplink resources for the uplink transmission;

identifying a listen-before-talk (LBT) scheme for initiating the uplink transmission based at least in part on information received in the uplink grant and the identified time difference between receiving the uplink grant and the uplink resources for the uplink transmission, the LBT scheme comprising a first duration LBT procedure or a second duration LBT procedure that is longer than the first duration LBT procedure; and performing the first duration LBT procedure or the second duration LBT procedure based at least in part on the identified LBT scheme and the identified time difference.

2. The method of claim 1, further comprising:
receiving one or more parameters for identifying the LBT scheme for initiating the uplink transmission, and
wherein the identifying the LBT scheme is further based at least in part on the one or more parameters.

3. The method of claim 2, wherein the receiving one or more parameters comprises:
receiving one or more of a common downlink control channel transmission, the uplink grant, or radio resource control (RRC) signaling including the one or more parameters.

4. The method of claim 1, wherein the receiving the uplink grant comprises:
receiving, in a first subframe, a grant of uplink resources to be used for an uplink transmission in a second subframe that is subsequent to the first subframe.

5. The method of claim 4, wherein the uplink grant further indicates a starting time for the uplink transmission.

6. The method of claim 5, wherein the starting time is determined based at least in part on a first time between the uplink grant and a start of the uplink resources or a second time between the start of the second subframe and the start of the uplink resources.

7. The method of claim 4, wherein the uplink grant further indicates a duration of the uplink grant.

8. The method of claim 7, wherein the duration of the uplink grant is determined based at least in part on an indicated duration of the uplink transmission contained in the uplink grant, a first time between the uplink grant and an end of the uplink resources or a second time between a beginning of the second subframe and the end of the uplink resources.

9. The method of claim 4, wherein the uplink grant further indicates a duration of a transmission opportunity (TxOP), and wherein the duration of the TxOP is determined based at least in part on one or more of an indication of the TxOP duration, a length of one or more downlink bursts within the TxOP, a length of one or more uplink bursts within the TxOP, or a frame structure for the first subframe and second subframe.

10. The method of claim 4, further comprising:
receiving a trigger to initiate the uplink transmission.

11. The method of claim 10, wherein the trigger comprises an indication received in a broadcast control channel transmission, an indication in a unicast control channel transmission, or an indication in layer1 signaling.

12. The method of claim 10, wherein the trigger comprises an indication that the uplink transmission is to be started or an indication of an uplink subframe location within a transmission opportunity.

13. The method of claim 10, wherein the trigger is transmitted on multiple downlink subframes.

14. The method of claim 10, further comprising:
determining that the trigger to start the uplink transmission is not received within a first time period; and
shifting the uplink resources to a subsequent subframe, or disregarding uplink resources within the first time period.

15. The method of claim 10, further comprising:
determining that a wireless medium is not available for uplink transmissions based at least in part on performing the first duration LBT procedure or the second duration LBT procedure following the trigger; and
shifting the uplink resources to a subsequent subframe, or disregarding uplink resources within a time period associated with the selected LBT scheme.

16. The method of claim 4, further comprising:
receiving an indication of an expiration of the uplink grant.

17. The method of claim 16, wherein the indication of the expiration of the uplink grant is received in the uplink grant, is received in semi-static signaling, or is statically configured.

18. The method of claim 16, wherein the expiration of the uplink grant corresponds to a total transmission length associated with a transmission opportunity for the uplink transmission or an uplink burst length of the uplink resources within the transmission opportunity.

19. An apparatus for wireless communication, comprising:
means for receiving an uplink grant identifying uplink resources for an uplink transmission;
means for identifying, after receiving the uplink grant, a time difference between receiving the uplink grant and the uplink resources for the uplink transmission;
means for identifying a listen-before-talk (LBT) scheme for initiating the uplink transmission based at least in part on information received in the uplink grant and the identified time difference between receiving the uplink grant and the uplink resources for the uplink transmission, the LBT scheme comprising a first duration LBT procedure or a second duration LBT procedure that is longer than the first duration LBT procedure; and
means for performing the first duration LBT procedure or the second duration LBT procedure based at least in part on the identified LBT scheme and the identified time difference.

20. The apparatus of claim 19, further comprising:
means for receiving a trigger to initiate the uplink transmission.

21. The apparatus of claim 20, wherein the trigger comprises an indication that the uplink transmission is to be started or an indication of an uplink subframe location within a transmission opportunity.

22. An apparatus for wireless communication, comprising:
a processor;
memory in electronic communication with the processor; and
instructions stored in the memory and operable, when executed by the processor, to cause the apparatus to:
receive an uplink grant identifying uplink resources for an uplink transmission;
identify, after receiving the uplink grant, a time difference between receiving the uplink grant and the uplink resources for the uplink transmission;
identify a listen-before-talk (LBT) scheme for initiating the uplink transmission based at least in part on information received in the uplink grant and the identified time difference between receiving the uplink grant and the uplink resources for the uplink transmission, the LBT scheme comprising a first duration LBT procedure or a second duration LBT procedure that is longer than the first duration LBT procedure; and perform the first duration LBT procedure or the second duration LBT procedure based at least in part on the identified LBT scheme and the identified time difference.

23. The apparatus of claim 22, wherein the instructions are further executable by the processor to cause the apparatus to:

receive a trigger to initiate the uplink transmission.

24. The apparatus of claim 23, wherein the trigger comprises an indication that the uplink transmission is to be started or an indication of an uplink subframe location within a transmission opportunity.

25. A non-transitory computer-readable medium storing code for wireless communication, the code comprising instructions executable to:

receive an uplink grant identifying uplink resources for an uplink transmission;

identify, after receiving the uplink grant, a time difference between receiving the uplink grant and the uplink resources for the uplink transmission;

identify a listen-before-talk (LBT) scheme for initiating the uplink transmission based at least in part on information received in the uplink grant, the uplink resources for the uplink transmission and the identified time difference between receiving the uplink grant and the uplink resources for the uplink transmission, the LBT scheme comprising a first duration LBT procedure or a second duration LBT procedure that is longer than the first duration LBT procedure; and perform the first duration LBT procedure or the second duration LBT procedure based at least in part on the identified LBT scheme and the identified time difference.

26. The non-transitory computer-readable medium of claim 25, wherein the code comprises instructions further executable to:

receive a trigger to initiate the uplink transmission.

* * * * *